(12) United States Patent
Takenaka et al.

(10) Patent No.: US 10,494,515 B2
(45) Date of Patent: Dec. 3, 2019

(54) PROCESS FOR PREPARING VULCANIZED RUBBER COMPOSITION, VULCANIZED RUBBER COMPOSITION AND STUDLESS TIRE USING SAME

(71) Applicant: SUMITOMO RUBBER INDUSTRIES, LTD., Kobe-shi, Hyogo (JP)

(72) Inventors: Mikako Takenaka, Kobe (JP); Ryoji Kojima, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 185 days.

(21) Appl. No.: 15/519,877

(22) PCT Filed: Nov. 13, 2015

(86) PCT No.: PCT/JP2015/082009
§ 371 (c)(1),
(2) Date: Apr. 18, 2017

(87) PCT Pub. No.: WO2016/076423
PCT Pub. Date: May 19, 2016

(65) Prior Publication Data
US 2017/0240732 A1  Aug. 24, 2017

(30) Foreign Application Priority Data

Nov. 14, 2014 (JP) ................................ 2014-232213

(51) Int. Cl.
| C08L 15/00 | (2006.01) |
| C08J 3/22 | (2006.01) |
| C08K 3/36 | (2006.01) |
| C08L 7/00 | (2006.01) |

(52) U.S. Cl.
CPC ............. *C08L 15/00* (2013.01); *C08J 3/226* (2013.01); *C08L 7/00* (2013.01); *C08J 2307/00* (2013.01); *C08J 2315/00* (2013.01); *C08J 2407/00* (2013.01); *C08J 2415/00* (2013.01); *C08L 2310/00* (2013.01)

(58) Field of Classification Search
CPC ..................................... C08J 3/22; C08K 3/36
See application file for complete search history.

(56) References Cited

U.S. PATENT DOCUMENTS

| 8,022,132 B2 * | 9/2011 | Kojima ................. B60C 1/0016 524/492 |
| 8,258,241 B2 * | 9/2012 | Tanaka ..................... B60C 1/00 525/331.8 |
| 2006/0160945 A1 | 7/2006 | Hochi |
| 2010/0190906 A1 | 7/2010 | Kikuchi et al. |
| 2011/0015302 A1 | 1/2011 | Tanaka et al. |
| 2011/0046291 A1 | 2/2011 | Kojima |
| 2012/0214903 A1 | 8/2012 | Masumoto |
| 2012/0305828 A1 | 12/2012 | Gomi et al. |
| 2013/0267646 A1 | 10/2013 | Kameda et al. |
| 2014/0005297 A1 | 1/2014 | Papakonstantopoulos et al. |
| 2014/0148554 A1 | 5/2014 | Ma et al. |
| 2014/0364536 A1 | 12/2014 | Kawai |
| 2015/0329716 A1 | 11/2015 | Kojima et al. |

FOREIGN PATENT DOCUMENTS

| CN | 101611077 A | 12/2009 |
| CN | 101993552 A | 3/2011 |
| EP | 2 233 317 A1 | 9/2010 |
| JP | 6-248117 A | 9/1994 |
| JP | 2006-89636 A | 4/2006 |
| JP | 2006-348222 A | 12/2006 |
| JP | 2010202819 A * | 9/2010 |
| JP | 2011-38057 A | 2/2011 |
| JP | 2011-88988 A | 5/2011 |
| JP | 2012-172020 A | 9/2012 |

(Continued)

OTHER PUBLICATIONS

Machine translation of JP 2010-202819 A, published Sep. 16, 2010. (Year: 2010).*
International Search Report, issued in PCl/JP2015/082009 (PCT/ISA/210), dated Feb. 16, 2016.
Written Opinion of the International Searching Authority, issued in PCT/JP2015/082009 (PCT/ISA/237), dated Feb. 16, 2016.
English translation of International Preliminary Report on Patentability and Written Opinion dated May 26, 2017, in PCT International Application No. PCT/JP2015/082009.
Extended European Search Report dated Apr. 4, 2018, in European Patent Application No. 15858974.7.

(Continued)

*Primary Examiner* — Vickey Nerangis
(74) *Attorney, Agent, or Firm* — Birch, Stewart, Kolasch & Birch, LLP

(57) ABSTRACT

According to the process for preparing a vulcanized rubber composition of the invention comprising (a) a step of preparing a master batch comprising a modified conjugated diene polymer and silica, (b) a step of preparing a master batch comprising an isoprene rubber and silica, (c) a step of kneading the master batch obtained in (a) and the master batch obtained in (b), and (d) a step of vulcanizing a kneaded product obtained in (c), wherein the obtained vulcanized rubber composition comprises a phase A comprising a modified conjugated diene polymer and a phase B comprising an isoprene rubber, which are incompatible with each other, an abundance ratio $\alpha$ of silica in the phase A satisfies $0.5 \leq \alpha \leq 0.9$ (Relation 1), and a proportion $\beta$ of the modified conjugated diene polymer satisfies $0.4 \leq \beta \leq 0.8$ (Relation 2) it is possible to improve performance on ice and abrasion resistance and to provide a vulcanized rubber composition having excellent performance on ice and abrasion resistance, and a studless tire with a tread made using the same.

17 Claims, 1 Drawing Sheet

(56) References Cited

FOREIGN PATENT DOCUMENTS

| | | |
|---|---|---|
| JP | 2013-75986 A | 4/2013 |
| JP | 2014-145063 A | 8/2014 |
| JP | 2015-232112 A | 12/2015 |
| RU | 2 441 888 C2 | 2/2011 |
| SU | 1375630 A1 | 2/1988 |
| WO | WO 2011/099395 A1 | 8/2011 |

OTHER PUBLICATIONS

Office Action dated Jul. 1, 2019, in Chinese Patent Application No. 201580059354.6.
Office Action with Search Report dated May 23, 2019, in Russian Patent Application No. 2017115216/05(026401).

* cited by examiner

PROCESS FOR PREPARING VULCANIZED RUBBER COMPOSITION, VULCANIZED RUBBER COMPOSITION AND STUDLESS TIRE USING SAME

TECHNICAL FIELD

The present invention relates to a process for preparing a vulcanized rubber composition, the vulcanized rubber composition and a studless tire produced using the vulcanized rubber composition.

BACKGROUND OF THE INVENTION

For running on ice and snow on a road, use of a studded tire and fitting of chains on tires have been employed so far, and in order to cope with an environmental problem such as a problem with a dust caused thereby, a studless tire has been developed. In order to enhance low temperature property of a studless tire, various improvements have been made from material and design points of view, and for example, a rubber composition prepared by compounding a large amount of mineral oil to a diene rubber being excellent in low temperature property, or the like has been used. However, generally as an amount of mineral oil is increased, abrasion resistance is decreased.

On an ice- and snow-covered road, as compared with a normal road surface, a friction coefficient of a tire decreases significantly and slippage is apt to occur. Therefore, not only low temperature property but also well-balanced performance on ice and snow (grip performance on ice and snow) and abrasion resistance are demanded for a studless tire. However, in many cases, performance on ice and snow is inconsistent with abrasion resistance, and it is generally difficult to improve the both properties simultaneously.

In order to improve performance on ice and snow and abrasion resistance in good balance, there is a prior art (Patent Document 1) for blending silica and a softening agent in large amounts. However, there is still a room for improvement from the viewpoint of well-balanced improvement of the both performances.

Further, a method of compounding a plurality of polymer (rubber) components (polymer blend) has been employed as a method of improving various tire performances such as low temperature property, performance on ice and snow and abrasion resistance in good balance. Specifically, a mainstream of the method is to blend some polymer components represented by a styrene-butadiene rubber (SBR), a butadiene rubber (BR), and a natural rubber (NR) as rubber components for a tire. This is a means for making good use of characteristic of each polymer component and deriving physical properties of a rubber composition which cannot be derived only by a single polymer component.

In this polymer blend, a phase structure (morphology) of each rubber component after vulcanization and a degree of distribution (localization) of a filler into each rubber phase will be important factors for deciding physical properties. Elements for deciding control of morphology and localization of a filler are very complicated, and various studies have been made in order to exhibit physical properties of a tire in good balance, but there is a room for improvement in any of the studies.

For example, Patent Document 2 discloses a technology of specifying a particle size of an island phase and a silica distribution in an sea-island matrix of a rubber composition for a tire tread comprising a styrene-butadiene rubber. However, regarding a concrete method enabling the morphology thereof to be realized, there are described only use of a master batch comprising silica and adjustment of a kneading time and a rotation torque of a rotor, and in such a method, the morphology is affected greatly by kneading and vulcanizing conditions, and therefore, stable control of the morphology is difficult. Further, the rubber component disclosed in examples is a combination of styrene-butadiene rubbers having relatively similar polarities. Therefore, it is apparent that the disclosed technology cannot be applied to the blending of rubber components having greatly different polarities, namely greatly different affinities for silica such as blending of a butadiene rubber and a natural rubber.

Particularly in the case of control of dispersion of silica between the phases using a master batch comprising silica, even if a desired morphology and silica dispersion are achieved temporarily, in many cases, the morphology and the silica dispersion change with a lapse of time and therefore, it was difficult to form a morphology being stable with a lapse of time of more than several months.

Patent Document 3 discloses a technology relating to control of a morphology and localization of silica in a compounding formulation comprising a natural rubber and a butadiene rubber. However, there is no description regarding the control of localization of silica into the butadiene rubber side in the case where the butadiene rubber which is disadvantageous to localization of silica forms a continuous phase.

A natural rubber is an important rubber component in a rubber composition for a tire, especially for a side wall because of its excellent mechanical strength, etc. However, in the case of blending with a butadiene rubber, localization of silica is apt to arise, and it is necessary to set the compounding formulation while controlling a distributing state of silica. However, so far a morphology and a distribution state of silica have not been checked sufficiently, and there was a case of a compounding formulation giving an insufficient exhibition of physical properties.

Furthermore, recently, there is a tendency of conducting modification of a natural rubber for enhancing affinity thereof for silica in order to aim at enhancement of fuel efficiency, which makes possibility of localization of silica into a natural rubber more significant.

Further, recently there are many cases of compounding a high cis butadiene rubber being excellent in abrasion resistance and low temperature grip performance. However, among diene rubbers, a high cis butadiene rubber is low in affinity particularly for silica and in a compounding system thereof with a natural rubber, there is a tendency that silica is hardly incorporated into a high cis butadiene rubber phase. Therefore, in a conventional system of compounding a high cis butadiene rubber, in some cases, a compounding formulation so as not to exhibit sufficient physical properties was employed while a morphology and a state of silica distribution were not confirmed.

In particular, in a rubber composition for a side wall, it is important to prepare a rubber composition comprising, as a continuous phase, a butadiene rubber having performance required for a side wall such as flex-crack resistance, and a technology of conducting control of silica localization on a continuous phase rubber component making a great contribution to abrasion resistance is essential.

Further, a natural rubber tends to hardly form a continuous phase as compared with a butadiene rubber, and in a compounding system where a natural rubber is blended in an amount of not more than 50 parts by mass based on 100 parts by mass of rubber components, such a tendency is further significant, and a so-called island phase is formed. Generally, a circumference of a rubber component being present in an island phase is solidified with a rubber component of a continuous phase, and therefore, there is a tendency that a hardness of the rubber component of an island phase increases and a rubber elasticity thereof is lowered. If a filler is localized, the tendency thereof increases more, and as a result, a difference in a hardness from the continuous phase rubber component increases, thereby easily causing a decrease in a rubber strength and abrasion resistance. A natural rubber is apt to have a hardness larger than a butadiene rubber even in the case of a single use thereof, and therefore, primarily it is not desirable that a difference in hardness further increases due to localization of silica. Therefore, development of a technology of not causing excessive localization of silica at a natural rubber side is important.

With respect to formation of a morphology of a plurality of polymer components in a rubber composition for a tire, only a compatible type (single phase) or in the case of incompatible type, only an sea-island phase structure, wherein a phase (island phase) of other particulate component is present in a continuous phase (sea phase), have been studied so far.

Therefore, in a system using a blend of a butadiene rubber and a natural rubber which is useful for exhibiting physical properties of a tire while polarities thereof are different from each other, development of technologies for morphology control and silica distribution to exhibit good physical properties of a rubber has been considered to be necessary.

PRIOR ART DOCUMENT

Patent Document

Patent Document 1: JP 2011-038057 A
Patent Document 2: JP 2006-089636 A
Patent Document 3: JP 2006-348222 A

SUMMARY OF THE INVENTION

Problem to be Solved by the Invention

It is an object of the present invention to provide a process for preparing a vulcanized rubber composition being capable of well-balanced improvement of performance on ice and abrasion resistance, a vulcanized rubber composition having excellent performance on ice and abrasion resistance, and a studless tire comprising a tread composed of the vulcanized rubber composition.

Means to Solve the Problem

The present invention relates to:
[1] a process for preparing a vulcanized rubber composition comprising:
(a) a step of preparing a master batch comprising a modified conjugated diene polymer and silica,
(b) a step of preparing a master batch comprising an isoprene rubber and silica,
(c) a step of kneading the master batch obtained in the step (a) and the master batch obtained in the step (b), and
(d) a step of vulcanizing a kneaded product obtained in the step (c),
wherein the vulcanized rubber composition comprises:
a phase comprising the modified conjugated diene polymer and silica (phase A), and a phase comprising the isoprene rubber and silica (phase B),
wherein the phase A and the phase B are incompatible with each other,
an abundance ratio a of silica in the phase A 100 to 500 hours after completion of a vulcanization step satisfies the following Relation 1, and
a proportion β of the modified conjugated diene polymer satisfies the following Relation 2:

$$0.5 \leq \alpha \leq 0.9 \text{(preferably } 0.6 \leq \alpha \leq 0.8) \quad \text{(Relation 1)}$$

$$0.4 \leq \beta \leq 0.8 \text{(preferably } 0.5 \leq \beta \leq 0.7) \quad \text{(Relation 2)}$$

wherein $\alpha$=Amount of silica in phase A/(Amount of silica in phase A+Amount of silica in phase B) and $\beta$=Mass of modified conjugated diene polymer in vulcanized rubber composition/(Mass of modified conjugated diene polymer in vulcanized rubber composition+Mass of isoprene rubber in vulcanized rubber composition),

[2] the process for preparation of the above [1], wherein the master batch comprising a modified conjugated diene polymer and silica comprises not less than 40 parts by mass, preferably not less than 50 parts by mass, and preferably not more than 100 parts by mass, more preferably not more than 80 parts by mass of silica based on 100 parts by mass of the modified conjugated diene polymer,

[3] the process for preparation of the above [1] or [2], wherein the master batch comprising an isoprene rubber and silica comprises not less than 15 parts by mass, preferably not less than 30 parts by mass, and preferably not more than 100 parts by mass, more preferably not more than 80 parts by mass of silica based on 100 parts by mass of the isoprene rubber,

[4] the process for preparation of any one of the above [1] to [3], wherein the vulcanized rubber composition comprises 25 to 120 parts by mass, preferably 30 to 70 parts by mass of a filler and 15 to 80 parts by mass, preferably 20 to 70 parts by mass of a softening agent based on 100 parts by mass of a rubber component comprising the isoprene rubber and the modified conjugated diene polymer, and the filler comprises not less than 50% by mass, preferably not less than 70% by mass of silica based on a total amount of the filler,

[5] the process for preparation of any one of the above [1] to [4], wherein the modified conjugated diene polymer is obtained by a process for preparation comprising a modification step (A) for performing a modification reaction by using a conjugated diene polymer having a content of cis-1,4 bond of not less than 98.5% by mass, preferably not less than 99.0% by mass, more preferably not less than 99.2% by mass and having an active terminal to introduce an alkoxysilane compound having 2 or more reaction groups including an alkoxysilyl group into the active terminal of the conjugated diene polymer, and a condensation step (B) for condensation reaction of a residue of the alkoxysilane compound introduced into the active terminal in the presence of a condensation catalyst comprising at least one element among elements of group 4A, group 2B, group 3B, group 4B and group 5B of the Periodic Table, wherein the conjugated diene polymer is one prepared by polymerization in the presence of a catalytic composition comprising, as a main component, a mixture of the following components (i) to (iii):

Component (i): Lanthanoid-containing compound comprising at least any one of lanthanoid elements or a reaction product obtained by a reaction of the lanthanoid-containing compound and a Lewis base,
Component (ii): At least one selected from the group consisting of aluminoxanes and organoaluminum compounds represented by a general formula (1): AlR$^1$R$^2$R$^3$, wherein R$^1$ and R$^2$ are the same or different and each is a hydrocarbon group having 1 to 10 carbon atoms or hydrogen atom, R$^3$ is a hydrocarbon group having 1 to 10 carbon atoms and being the same as or different from R$^1$ or R$^2$, Component (iii): Iodine-containing compound having at least one iodine atom in a molecular structure thereof,

[6] the process for preparation of the above [5], wherein an amount of 1,2-vinyl bond of the conjugated diene polymer is not more than 0.5% by mass, preferably not more than 0.4% by mass, more preferably not more than 0.3% by mass, and preferably not less than 0.001% by mass, more preferably not less than 0.01% by mass,

[7] the process for preparation of the above [5] or [6], wherein the condensation catalyst is a condensation catalyst comprising titanium (Ti),

[8] the process for preparation of any one of the above [5] to [7], wherein the alkoxysilane compound has at least one functional group selected from the group consisting of the following (iv) to (vii):
(iv): epoxy group
(v): isocyanate group
(vi): carbonyl group
(vii): cyano group,

[9] the process for preparation of any one of the above [5] to [8], wherein the alkoxysilane compound having at least one functional group selected from the group consisting of the following (viii) to (x) is further added in the modification step (A):
(viii): amino group
(ix): imino group
(x): mercapto group,

[10] the process for preparation of any one of the above [5] to [9], wherein the condensation step (B) is performed in an aqueous solution having a pH value of from 9 to 14, preferably from 10 to 12 and a temperature of from 85° C. to 180° C., preferably from 100° C. to 170° C., more preferably from 110° C. to 150° C.,

[11] the process for preparation of any one of the above [1] to [10], wherein the conjugated diene compound constituting the modified conjugated diene polymer is at least one selected from the group consisting of 1,3-butadiene, isoprene and 2,3-dimethyl-1,3-butadiene,

[12] a vulcanized rubber composition comprising:
a phase comprising a modified conjugated diene polymer and silica (phase A), and a phase comprising an isoprene rubber and silica (phase B),
wherein the phase A and the phase B are incompatible with each other,
an abundance ratio α of silica in the phase A 100 to 500 hours after completion of a vulcanization step satisfies the following Relation 1, and
a proportion β of the modified conjugated diene polymer satisfies the following Relation 2:

$0.5 \leq \alpha \leq 0.9$ (preferably $0.6 \leq \alpha \leq 0.8$)  (Relation 1)

$0.4 \leq \beta \leq 0.8$ (preferably $0.5 \leq \beta \leq 0.7$)  (Relation 2)

wherein α=Amount of silica in phase A/(Amount of silica in phase A+Amount of silica in phase B) and β=Mass of modified conjugated diene polymer in vulcanized rubber composition/(Mass of modified conjugated diene polymer in vulcanized rubber composition+Mass of isoprene rubber in vulcanized rubber composition),

[13] the vulcanized rubber composition of the above [12], comprising 25 to 120 parts by mass, preferably 30 to 70 parts by mass of a filler and 15 to 80 parts by mass, preferably 20 to 70 parts by mass of a softening agent based on 100 parts by mass of the rubber components comprising the isoprene rubber and the modified conjugated diene polymer, wherein the filler comprises not less than 50% by mass, preferably not less than 70% by mass of silica based on the total amount of filler,

[14] the vulcanized rubber composition of the above [12] or [13], wherein the modified conjugated diene polymer is obtained by a process for preparation comprising a modification step (A) for performing a modification reaction by using a conjugated diene polymer having a content of cis-1,4 bond of not less than 98.5% by mass, preferably not less than 99.0% by mass, more preferably not less than 99.2% by mass and having an active terminal to introduce an alkoxysilane compound having 2 or more reaction groups including an alkoxysilyl group into the active terminal of the conjugated diene polymer, and a condensation step (B) for condensation reaction of a residue of the alkoxysilane compound introduced into the active terminal in the presence of a condensation catalyst comprising at least one element among elements of group 4A, group 2B, group 3B, group 4B and group 5B of the Periodic Table, wherein the conjugated diene polymer is one prepared by polymerization in the presence of a catalytic composition comprising, as a main component, a mixture of the following components (i) to (iii):

Component (i): Lanthanoid-containing compound comprising at least any one of lanthanoid elements or a reaction product obtained by a reaction of the lanthanoid-containing compound and a Lewis base, Component (ii): At least one selected from the group consisting of aluminoxanes and organoaluminum compounds represented by a general formula (1): AlR$^1$R$^2$R$^3$, wherein R$^1$ and R$^2$ are the same or different and each is a hydrocarbon group having 1 to 10 carbon atoms or hydrogen atom, R$^3$ is a hydrocarbon group having 1 to 10 carbon atoms and being the same as or different from R$^1$ or R$^2$, Component (iii): Iodine-containing compound having at least one iodine atom in a molecular structure thereof,

[15] the vulcanized rubber composition of the above [14], wherein an amount of 1,2-vinyl bond of the conjugated diene polymer is not more than 0.5% by mass, preferably not more than 0.4% by mass, more preferably not more than 0.3% by mass, and preferably not less than 0.001% by mass, more preferably not less than 0.01% by mass,

[16] the vulcanized rubber composition of the above [14] or [15], wherein the condensation catalyst is a condensation catalyst comprising titanium (Ti),

[17] the vulcanized rubber composition of any one of the above [14] to [16], wherein the alkoxysilane compound has at least one functional group selected from the group consisting of the following (iv) to (vii):
(iv): epoxy group
(v): isocyanate group
(vi): carbonyl group
(vii): cyano group,

[18] the vulcanized rubber composition of any one of the above [14] to [17], wherein the alkoxysilane compound having at least one functional group selected from the group consisting of the following (viii) to (x) is further added in the modification step (A):
(viii): amino group
(ix): imino group
(x): mercapto group,

[19] the vulcanized rubber composition of any one of the above [14] to [18], wherein the condensation step (B) is performed in an aqueous solution having a pH value of from 9 to 14, preferably from 10 to 12 and a temperature of from 85° C. to 180° C., preferably from 100° C. to 170° C., more preferably from 110° C. to 150° C.,

[20] the vulcanized rubber composition of any one of the above [12] to [19], wherein the conjugated diene compound constituting the modified conjugated diene polymer is at least one selected from the group consisting of 1,3-butadiene, isoprene and 2,3-dimethyl-1,3-butadiene, and

[21] a studless tire comprising a tread composed of the vulcanized rubber composition of any one of the above [12] to [20].

Effects of the Invention

According to the present invention, after a modified conjugated diene polymer and an isoprene rubber are respectively combined with silica to produce respective master batches, the obtained master batches are kneaded, thereby enabling performance on ice and abrasion resistance of an obtained vulcanized rubber composition to be improved in good balance. Further, by using this vulcanized rubber composition for a tire member such as a tread, a studless tire being excellent in these performances can be provided.

EMBODIMENT FOR CARRYING OUT THE INVENTION

Generally while a Banbury mixer is used for mixing to prepare a rubber composition for a tire, in a compounding formulation comprising an isoprene rubber such as a natural rubber/a butadiene rubber, since silica is localized in an isoprene rubber phase, there is a limit in dispersion of silica in a compound and low temperature property and abrasion resistance tend to be decreased. However, in the present invention, it was found that by using a modified conjugated diene polymer instead of a butadiene rubber and kneading a modified conjugated diene polymer and an isoprene rubber after respectively combining them with silica to produce respective master batches, silica can be distributed to both of the isoprene rubber phase and the modified conjugated diene polymer phase, and the dispersion of silica is further enhanced.

The enhancement of the dispersion of silica relaxes stress concentration in the compound when a distortion is applied, and enhancement of low temperature property and abrasion resistance can be expected.

The process for preparing a vulcanized rubber composition which is one embodiment of the present invention comprises (a) a step of preparing a master batch comprising a modified conjugated diene polymer and silica, (b) a step of preparing a master batch comprising an isoprene rubber (IR) and silica, (c) a step of kneading the master batch obtained in the step (a) and the master batch obtained in the step (b), and (d) a step of vulcanizing a kneaded product obtained in the step (c), and the obtained vulcanized rubber composition has predetermined properties. As mentioned above, by using the modified conjugated diene polymer and kneading the master batches prepared separately by kneading each rubber component with silica, the silica which is prone to be localized in an isoprene rubber can also be localized in the modified conjugated diene polymer, and it is possible to easily prepare a vulcanized rubber composition which satisfies a predetermined abundance ratio α of silica in the phase A comprising the modified conjugated diene polymer and the silica, and satisfies a predetermined proportion β of the modified conjugated diene polymer, thereby enabling the silica to improve performance on ice without deteriorating excellent abrasion resistance of the isoprene rubber (IR) and making it possible to obtain these performances in good balance.

Figure 1A:
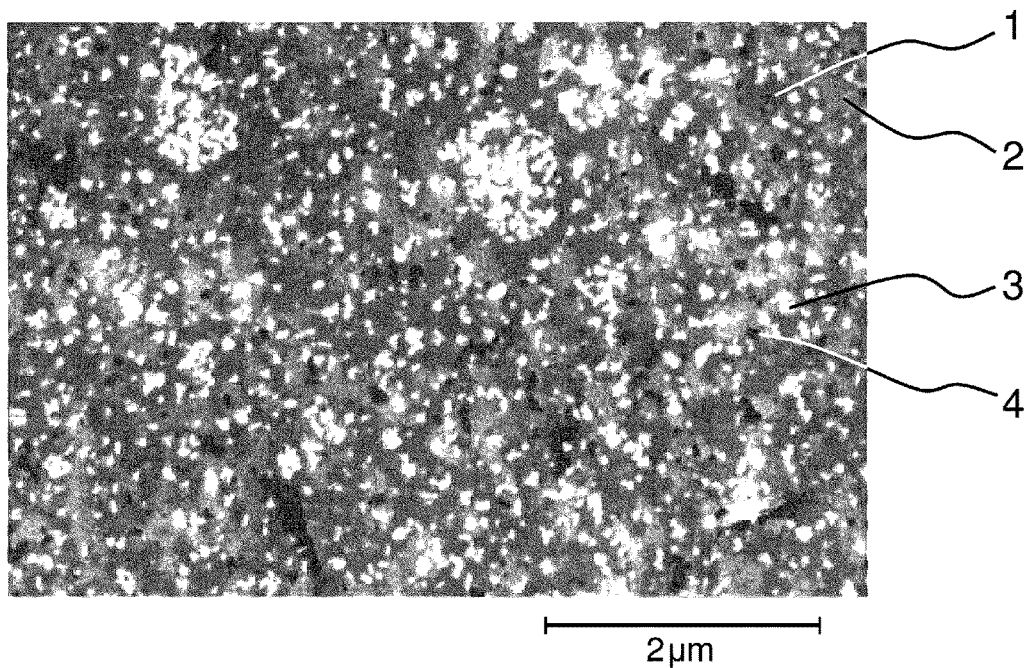
FIG. 1A is a figure showing an SEM photograph of a cross section of a vulcanized rubber composition wherein silica is well dispersed.
Figure 1B:
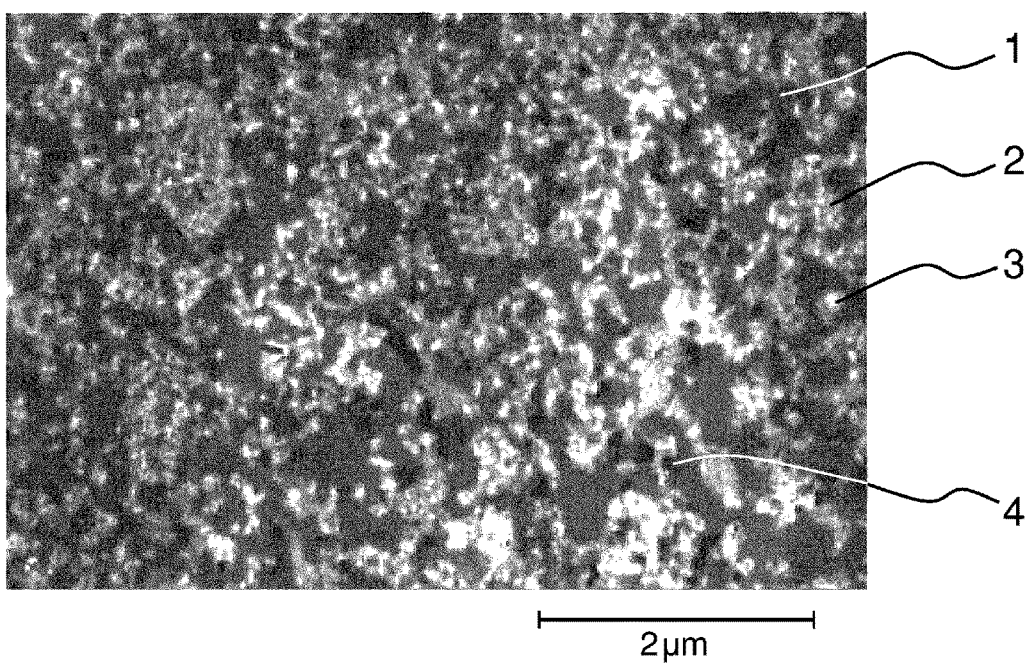
FIG. 1B is a figure showing an SEM photograph of a cross section of a vulcanized rubber composition wherein silica is localized.

A dispersion state of silica to the rubber components in the vulcanized rubber composition can be observed with a scanning electron microscope (SEM). For example, in an example where dispersion of silica is satisfactory, as can be seen in FIG. 1A, a phase 1 comprising a butadiene rubber (BR phase) forms a sea phase, a phase 2 comprising an isoprene rubber (natural rubber) (IR phase) forms an island phase, and silica 3 is dispersed to both of the BR phase 1 and the IR phase 2. Meanwhile, in an example where silica is localized in one phase, as can be seen in FIG. 1B, silica 3 is localized in the IR phase 2 and is not dispersed to both phases, although the BR phase 1 forms a sea phase and the IR phase 2 forms an island phase similarly to FIG. 1A.

(a) Step of Preparing a Master Batch Comprising the Modified Conjugated Diene Polymer (Kneading Step X1)

The process for preparing the master batch comprising the modified conjugated diene polymer is not limited particularly, and the master batch can be prepared by kneading the modified conjugated diene polymer and silica. The kneading method is not limited particularly, and a kneader, which is usually used in a rubber industry, such as a Banbury mixer or an open roll can be used. The master batch can also be prepared, for example, as a wet master batch obtainable by mixing a modified conjugated diene polymer latex with an aqueous dispersion of silica.

A kneading temperature in the kneading step X1 is preferably not less than 80° C., more preferably not less than 100° C., further preferably not less than 140° C. The kneading temperature of not less than 80° C. enables a reaction of a silane coupling agent with silica to be advanced sufficiently and the silica to be dispersed satisfactorily and makes performance on snow and ice and abrasion resistance be easily improved in good balance. Further, the kneading temperature in the kneading step X1 is preferably not more than 200° C., more preferably not more than 190° C., further preferably not more than 180° C. The kneading temperature of not more than 200° C. tends to inhibit an increase in a Mooney viscosity and make processability satisfactory. Further, the temperature of a kneaded product at the time of discharge from the kneader can be from 130° C. to 160° C.

A kneading time in the kneading step X1 is not limited particularly, and is usually 30 seconds or more, preferably from 1 to 30 minutes, more preferably from 3 to 6 minutes.

The modified conjugated diene polymer is not limited particularly, and a modified conjugated diene polymer prepared by modifying a conjugated diene polymer so as to have an alkoxyl group as a modifying group is used preferably. Specifically, there is a modified conjugated diene polymer obtained by the process for preparation comprising the modification step (A) for performing a modification reaction by using a conjugated diene polymer having a content of cis-1,4 bond of not less than 98.5% by mass and having an active terminal to introduce an alkoxysilane compound having 2 or more reaction groups including an alkoxysilyl group into the active terminal of the conjugated diene polymer, and the condensation step (B) for condensation reaction of a residue of the alkoxysilane compound introduced into the active terminal in the presence of a condensation catalyst comprising at least one element among elements of group 4A, group 2B, group 3B, group 4B and group 5B of the Periodic Table, wherein the conjugated diene polymer is one prepared by polymerization in the presence of a catalytic composition comprising, as a main component, a mixture of the following Components (i) to (iii):

Component (i): Lanthanoid-containing compound comprising at least any one of lanthanoid elements or a reaction product obtained by a reaction of the lanthanoid-containing compound and a Lewis base, Component (ii): At least one selected from the group consisting of aluminoxanes and organoaluminum compounds represented by a general formula (1): $AlR^1R^2R^3$, wherein $R^1$ and $R^2$ are the same or different and each is a hydrocarbon group having 1 to 10 carbon atoms or hydrogen atom, $R^3$ is a hydrocarbon group having 1 to 10 carbon atoms and being the same as or different from $R^1$ or $R^2$, Component (iii): Iodine-containing compound having at least one iodine atom in a molecular structure thereof.

Namely, the modified conjugated diene polymer to be used in the present invention can be prepared by performing the modification reaction to introduce an alkoxysilane compound into the active terminal of the conjugated diene polymer having a content of cis-1,4 bond of not less than 98.5% by mass and the condensation reaction of a residue of the alkoxysilane compound introduced into the active terminal in the presence of a condensation catalyst comprising at least one element among elements of group 4, group 12, group 13, group 14 and group 15 of the Periodic Table.

The modification step (A) is a step for performing a modification reaction by using a conjugated diene polymer having a content of cis-1,4 bond of not less than 98.5% by mass and having an active terminal to introduce an alkoxysilane compound having 2 or more reaction groups including an alkoxysilyl group into the active terminal of the conjugated diene polymer.

The conjugated diene polymer is a conjugated diene polymer having a content of cis-1,4 bond of not less than 98.5% by mass and having an active terminal. The content of the cis-1,4 bond is preferably not less than 99.0% by mass, further preferably not less than 99.2% by mass. When the content of the cis-1,4 bond is less than 98.5% by mass, performance on snow and ice and abrasion resistance of a studless tire produced using the rubber composition comprising the modified conjugated diene polymer may not be sufficient. In addition, herein the content of the cis-1,4 bond is a value calculated from signal strengths measured by NMR analysis.

For example, a polymer having a repeating unit derived from at least one monomer selected from the group consisting of 1,3-butadiene, isoprene, 2,3-dimethyl-1,3-butadiene, 1,3-pentadiene, 1,3-hexadiene and myrcene can be used as the conjugated diene polymer. Particularly, a polymer having a repeating unit derived from at least one monomer selected from the group consisting of 1,3-butadiene, isoprene and 2,3-dimethyl-1,3-butadiene can be used suitably. Namely, it is also one of the suitable embodiments of the present invention that the conjugated diene compound constituting the modified conjugated diene polymer is at least one conjugated diene compound selected from the group consisting of 1,3-butadiene, isoprene and 2,3-dimethyl-1,3-butadiene.

When preparing the conjugated diene polymer as mentioned above, the polymerization may be conducted using a solvent or may be conducted without a solvent. Inactive organic solvents can be used as the solvent to be used for the polymerization (polymerization solvent), and examples thereof include saturated aliphatic hydrocarbons having 4 to 10 carbon atoms such as butane, pentane, hexane and heptane, saturated alicyclic hydrocarbons having 6 to 20 carbon atoms such as cyclopentane and cyclohexane, monoolefins such as 1-butene and 2-butene, aromatic hydrocarbons such as benzene, toluene and xylene, halogenated hydrocarbons such as methylene chloride, chloroform, carbon tetrachloride, trichloroethylene, perchloroethylene, 1,2-dichloroethane, chlorobenzene, bromobenzene and chlorotoluene, and the like.

When preparing the conjugated diene polymer, a polymerization reaction temperature is preferably from −30° C. to 200° C., more preferably from 0° C. to 150° C. A manner of the polymerization reaction is not limited particularly, and a batch type reactor may be used or the polymerization may be conducted continuously using equipment such as a multistage continuous reactor. In addition, when using a polymerization solvent, a monomer concentration in the solvent is preferably 5 to 50% by mass, more preferably 7 to 35% by mass. From a viewpoint of efficiency of the preparation of the conjugated diene polymer and from a viewpoint of not deactivating the conjugated diene polymer having an active terminal, it is preferable not to mix a compound having a deactivating effect such as oxygen, water or carbon dioxide gas in a polymerization system as much as possible.

Further in the present invention, a conjugated diene polymer obtained by polymerization in the presence of a catalytic composition comprising a mixture of the following Components (i) to (iii) (hereinafter also referred to as "a catalyst") is used as a conjugated diene polymer to be used for preparing the modified conjugated diene polymer.

Component (i): Lanthanoid-containing compound comprising at least any one element selected from the group consisting of lanthanoids or a reaction product obtained by a reaction of the lanthanoid-containing compound and a Lewis base Component (ii): At least one compound selected from the group consisting of aluminoxanes and organoaluminum compounds represented by a general formula (1): $AlR^1R^2R^3$, wherein $R^1$ and $R^2$ are the same or different and each is a hydrocarbon group having 1 to 10 carbon atoms or hydrogen atom, $R^3$ is a hydrocarbon group having 1 to 10 carbon atoms and being the same as or different from $R^1$ or $R^2$ Component (iii): Iodine-containing compound having at least one iodine atom in a molecular structure thereof By the use of such a catalyst, the conjugated diene polymer having a content of cis-1,4 bond of not less than 98.5% by mass can be obtained. Further, in the case of this catalyst, it is not necessary to carry out the polymerization reaction at a very low temperature and operation is easy. Therefore, this catalyst is useful in industrial production.

The Component (i) is a lanthanoid-containing compound comprising at least one element selected from the group consisting of lanthanoids or a reaction product obtained by a reaction of the lanthanoid-containing compound and a Lewis base. Among lanthanoids, neodymium, praseodymium, cerium, lanthanum, gadolinium and samarium are preferable. In the preparation process of the present invention, neodymium is particularly preferable among them. The above-mentioned lanthanoids may be used alone or may be used in combination of two or more thereof. Examples of the lanthanoid-containing compound include carboxylate, alkoxide, β-diketone complex, phosphate and phosphite of lanthanoid, and the like. Among them, carboxylate or phosphate is preferable, and carboxylate is more preferable.

Examples of the carboxylate of lanthanoid include salts of carboxylic acid represented by a general formula (2): $(R^4—COO)_3M$, wherein M represents lanthanoid, and $R^4$s are the same or different and represent hydrocarbon groups having 1 to 20 carbon atoms. In the general formula (2), $R^4$s are preferably saturated or unsaturated alkyl groups and are preferably linear, branched or cyclic alkyl groups. Further the carboxyl group is bonded to a primary, secondary or tertiary carbon atom. Specific examples thereof include salts of octanoic acid, 2-ethylhexanoic acid, oleic acid, stearic acid, benzoic acid, naphthenic acid, brand name "Versatic acid" (available from Shell Chemicals Japan Ltd., carboxylic acid having a carboxyl group bonded to a tertiary carbon atom), and the like. Among these, salts of Versatic acid, 2-ethylhexanoic acid and naphthenic acid are preferable.

Examples of the alkoxide of lanthanoid include those represented by a general formula (3): $(R^5O)_3M$, wherein M represents lanthanoid. Examples of the alkoxy group represented by "$R^5O$" in the general formula (3) include a 2-ethyl-hexylalkoxy group, an oleylalkoxy group, a stearylalkoxy group, a phenoxy group, a benzylalkoxy group, and the like. Among these, a 2-ethyl-hexylalkoxy group and a benzylalkoxy group are preferable.

Examples of the β-diketone complex of lanthanoid include an acetylacetone complex, a benzoylacetone complex, a propionitrileacetone complex, a valerylacetone complex, an ethylacetylacetone complex, and the like. Among these, an acetylacetone complex and an ethylacetylacetone complex are preferable.

Examples of the phosphate or phosphite of lanthanoid include bis(2-ethylhexyl)phosphate, bis(1-methylheptyl)phosphate, bis(p-nonylphenyl)phosphate, bis(polyethyleneglycol-p-nonylphenyl)phosphate, (1-methylheptyl)(2-ethylhexyl)phosphate, (2-ethylhexyl) (p-nonylphenyl) phosphate, mono-2-ethylhexyl(2-ethylhexyl)phosphonate, mono-p-nonylphenyl(2-ethylhexyl)phosphonate, bis(2-ethylhexyl)phosphite, bis(1-methylheptyl)phosphite, bis(p-nonylphenyl)phosphite, (1-methylheptyl)(2-ethylhexyl)phosphite, (2-ethylhexyl)(p-nonylphenyl)phosphite, and the like. Among these, bis(2-ethylhexyl)phosphate, bis(1-methylheptyl)phosphate, mono-2-ethylhexyl(2-ethylhexyl)phosphonate and bis(2-ethylhexyl)phosphite are preferable.

Among these, phosphate of neodymium or carboxylate of neodymium are particularly preferable, and a neodymium salt of Versatic acid or neodymium 2-ethyl-hexanoate are most preferable.

In order to make the lanthanoid-containing compound soluble in a solvent or store the lanthanoid-containing compound stably for a long period of time, it is also preferable to mix the lanthanoid-containing compound with a Lewis base or react the lanthanoid-containing compound with a Lewis base to give a reaction product. An amount of the Lewis base is preferably 0 to 30 mol, more preferably 1 to 10 mol based on 1 mol of lanthanoid. Examples of the Lewis base include acetylacetone, tetrahydrofuran, pyridine, N,N-dimethylformamide, thiophene, diphenyl ether, triethylamine, an organophosphorus compound, monovalent or divalent alcohol, and the like. The above-mentioned Components (i) may be used alone or may be used in combination of two or more thereof.

The Component (ii) is at least one compound selected from the group consisting of aluminoxanes and organoaluminum compounds represented by a general formula (1): $AlR^1R^2R^3$, wherein $R^1$ and $R^2$ are the same or different and each is a hydrocarbon group having 1 to 10 carbon atoms or hydrogen atom, $R^3$ is a hydrocarbon group having 1 to 10 carbon atoms and being the same as or different from $R^1$ or $R^2$.

Aluminoxanes (hereinafter also referred to as "alumoxanes") are compounds having a structure represented by the following general formula (4) or (5). In addition, aluminoxanes may be aggregates of alumoxanes which are disclosed in Fine Chemical, 23, (9), 5 (1994), J. Am. Chem. Soc., 115, 4971 (1993), and J. Am. Chem. Soc., 117, 6465 (1995).

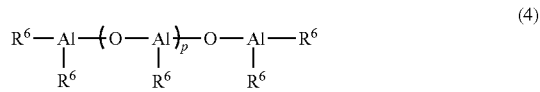

(4)

(5)

In the general formulae (4) and (5), $R^6$s are the same or different and each represents a hydrocarbon group having 1 to 20 carbon atoms. p is an integer of 2 or more. Examples of the $R^6$ include methyl, ethyl, propyl, butyl, isobutyl, tert-butyl, hexyl, isohexyl, octyl, isooctyl, and the like. Among these, methyl, ethyl, isobutyl and tert-butyl are preferable, and methyl is particularly preferable. In addition, the above-mentioned p is preferably an integer of 4 to 100.

Examples of the alumoxane include methyl alumoxane (hereinafter also referred to as "MAO"), ethyl alumoxane, n-propyl alumoxane, n-butyl alumoxane, isobutyl alumoxane, t-butyl alumoxane, hexyl alumoxane, iso-hexyl alumoxane, and the like. Among these, MAO is preferable. The above-mentioned alumoxanes can be prepared by a well-known method, and for example, can be prepared by adding trialkylaluminum or dialkylaluminum monochloride into an organic solvent such as benzene, toluene or xylene and further adding water, steam, steam-containing nitrogen gas or a salt containing crystallization water such as copper sulfate pentahydrate or aluminum sulfate.16H$_2$O, thereby allowing a mixture to be subjected to reaction. In addition, the above-mentioned alumoxanes may be used alone or may be used in combination of two or more thereof.

Examples of the organoaluminum compound represented by the general formula (1) include trimethylaluminum, triethylaluminum, tri-n-propylaluminum, triisopropylaluminum, tri-n-butylaluminum, triisobutylaluminum, tri-t-butylaluminum, tripentylaluminum, trihexylaluminum, tricyclohexylaluminum, trioctylaluminum, diethylaluminum hydride, di-n-propylaluminum hydride, di-n-butylaluminum hydride, diisobutylaluminum hydride, dihexylaluminum hydride, diisohexylaluminum hydride, dioctylaluminum hydride, diisooctylaluminum hydride, ethylaluminum dihydride, n-propylaluminum dihydride, isobutylaluminum dihydride, and the like. Among these, diisobutylaluminum hydride, triethylaluminum, triisobutylaluminum and diethylaluminum hydride are preferable, and diisobutylaluminum hydride is particularly preferable. The above-mentioned organoaluminum compounds may be used alone or may be used in combination of two or more thereof.

The Component (iii) is an iodine-containing compound having at least one iodine atom in a molecular structure thereof. When using such an iodine-containing compound, a conjugated diene polymer having a content of cis-1,4 bonds of not less than 98.5% by mass can be prepared easily. The above-mentioned iodine-containing compound is not limited particularly as far as at least one iodine atom is contained in the molecular structure thereof. Examples thereof include iodine, trimethylsilyl iodide, diethylaluminum iodide, methyl iodide, butyl iodide, hexyl iodide, octyl iodide, iodoform, diiodomethane, benzylidene iodide, beryllium iodide, magnesium iodide, calcium iodide, barium iodide, zinc iodide, cadmium iodide, mercury iodide, manganese iodide, rhenium iodide, copper iodide, silver iodide, gold iodide, and the like.

Among these, preferred as the above-mentioned iodine-containing compound is a silicon iodide compound represented by a general formula (6): $R^7qSiI_{4-q}$, wherein $R^7$s are the same or different and each represents a hydrocarbon group having 1 to 20 carbon atoms or hydrogen atoms and q is an integer of 0 to 3, an iodinated hydrocarbon compound represented by a general formula (7): $R^8_rI_{4-r}$, wherein $R^8$s are the same or different and each represents a hydrocarbon group having 1 to 20 carbon atoms and r is an integer of 1 to 3, or iodine. Such silicon iodide compound, iodinated hydrocarbon compound and iodine have good solubility in an organic solvent, thereby making operation simple, and therefore, are useful for industrial production. Namely, it is also one of the suitable embodiments of the present invention that the above-mentioned Component (iii) is at least one iodine-containing compound selected from the group consisting of silicon iodide compounds, iodinated hydrocarbon compounds and iodine.

Examples of the silicon iodide compounds (compounds represented by the general formula (6)) include trimethylsilyl iodide, triethylsilyl iodide, dimethylsilyl diiodo, and the like. Among these, trimethylsilyl iodide is preferable.

Examples of the iodinated hydrocarbon compounds (compounds represented by the general formula (7)) include methyl iodide, butyl iodide, hexyl iodide, octyl iodide, iodoform, diiodomethane, benzylidene iodide, and the like. Among these, methyl iodide, iodoform and diiodomethane are preferable.

Among these, particularly preferred as the iodine-containing compound are iodine, trimethylsilyl iodide, triethylsilyl iodide, dimethylsilyl diiodo, methyl iodide, iodoform and diiodomethane, and trimethylsilyl iodide is most preferable. The above-mentioned iodine-containing compounds may be used alone or may be used in combination of two or more thereof.

A compounding amount of each component (Components (i) to (iii)) may be appropriately set according to necessity. The compounding amount of Component (i) is preferably from 0.00001 to 1.0 mmol, more preferably from 0.0001 to 0.5 mmol to 100 g of the conjugated diene compound. When the amount is less than 0.00001 mmol, the polymerization activity may decrease. When Component (i) is used in an amount of more than 1.0 mmol, a concentration of the catalyst increases and there is a case where a demineralizing process is required.

When Component (ii) is alumoxane, a compounding amount of the alumoxane can be represented by a molar ratio of Component (i) to aluminum (Al) contained in the alumoxane, and "Component (i)":"aluminum (Al) contained in alumoxane" (molar ratio) is preferably 1:1 to 1:500, more preferably 1:3 to 1:250, further preferably 1:5 to 1:200. When the compounding amount of the alumoxane is out of the range mentioned above, activity of the catalyst decreases, or there is a case where a step for removing a residue of the catalyst is required.

When Component (ii) is an organoaluminum compound, a compounding amount of the organoaluminum compound can be represented by a molar ratio of Component (i) to the organoaluminum compound, and "Component (i)":"organoaluminum compound" (molar ratio) is preferably 1:1 to 1:700, more preferably 1:3 to 1:500. When the compounding amount of the organoaluminum compound is out of the range mentioned above, activity of the catalyst decreases, or there is a case where a step for removing a residue of the catalyst is required.

A compounding amount of Component (iii) can be represented by a molar ratio of iodine atoms contained in Component (iii) to Component (i), and (iodine atoms contained in Component (iii))/(Component (i)) (molar ratio) is preferably 0.5 to 3.0, more preferably 1.0 to 2.5, further preferably 1.2 to 2.0. When the molar ratio of (iodine atoms contained in Component (iii))/(Component (i)) is less than 0.5, the activity of the polymerization catalyst may decrease. When the molar ratio of (iodine atoms contained in Component (iii))/(Component (i)) is more than 3.0, Component (iii) may be catalytic poison.

In the above-mentioned catalyst, in addition to Components (i) to (iii), at least one compound selected from the group consisting of conjugated diene compounds and non-conjugated diene compounds is added in an amount of preferably not more than 1000 mol, more preferably from 3 to 1000 mol, further preferably from 5 to 300 mol to one mol of Component (i). Addition of at least one compound selected from the group consisting of conjugated diene compounds and non-conjugated diene compounds to the catalyst is preferred since activity of the catalyst is enhanced more. In that case, examples of the conjugated diene compound to be used include 1,3-butadiene, isoprene, and the like similarly to the monomer for the polymerization explained later. Examples of the non-conjugated diene compounds include divinylbenzene, diisopropenylbenzene, triisopropenylbenzene, 1,4-vinylhexadiene, ethylidenenorbornene, and the like.

The catalytic composition comprising a mixture of Components (i) to (iii) as a main component can be prepared by reacting Components (i) to (iii) dissolved in a solvent and further at least one compound selected from the group consisting of conjugated diene compounds and non-conjugated diene compounds and added according to necessity. When preparing the catalytic composition, an order of addition of each component may be decided optionally. Meanwhile, it should be noted that from the viewpoint of enhancement of polymerization activity and shortening of an induction period of time for polymerization initiation, preferably each component is previously mixed, reacted and further aged. An aging temperature is preferably from 0° C. to 100° C., more preferably from 20° C. to 80° C. When the aging temperature is lower than 0° C., the aging tends to be insufficient. On the other hand, when the aging temperature exceeds 100° C., there is a tendency that the activity of the catalyst decreases and widening of a molecular weight distribution is easily generated. An aging time is not limited particularly. Further, before addition into a polymerization reactor, each component may be brought into contact with each other in a supply line, and in that case, 0.5 minute or more suffices as an aging time. In addition, the prepared catalyst will be stable for several days.

With respect to the conjugated diene polymer to be used for preparing the modified conjugated diene polymer to be used in the present invention, a ratio of a weight-average molecular weight (Mw) to a number-average molecular weight (Mn) measured by a gel permeation chromatography, namely a molecular weight distribution (Mw/Mn) is preferably 3.5 or less, more preferably 3.0 or less, further preferably 2.5 or less. When the molecular weight distribution is more than 3.5, physical properties of a rubber such as breaking resistance and low heat build-up property tend to be deteriorated. On the other hand, a lower limit of the molecular weight distribution is not limited particularly. In addition, herein the molecular weight distribution (Mw/Mn) means a value calculated from a ratio of a weight-average molecular weight to a number-average molecular weight (a weight-average molecular weight/a number-average molecular weight). Here, the weight-average molecular weight of the conjugated diene polymer is a weight-average molecular weight obtained by measuring with a GPC method (gel permeation chromatography method) and calculating in terms of standard polystyrene. Further, the number-average molecular weight of the conjugated diene polymer is a number-average molecular weight obtained by measuring with a GPC method and calculating in terms of standard polystyrene.

In addition, the vinyl content and the cis-1,4 bond content can be easily adjusted by controlling a polymerization temperature. Further, the above-mentioned Mw/Mn can be easily adjusted by controlling a molar ratio between the above-mentioned Components (i) to (iii).

Further, a Mooney viscosity at 100° C. ($ML_{1+4}(100° C.)$) of the conjugated diene polymer is within a range of preferably from 5 to 50, more preferably from 10 to 40. When the Mooney viscosity is less than 5, there is a case where mechanical property, abrasion resistance and the like after vulcanization are deteriorated. On the other hand, when the Mooney viscosity exceeds 50, there is a case where processability at the time of kneading of the modified conjugated diene polymer after the modification reaction is deteriorated. The Mooney viscosity can be adjusted easily by controlling the molar ratio between the Components (i) to (iii). In addition, the Mooney viscosity ($ML_{1+4}(100° C.)$) is a value obtained by the measuring method described in Example explained later.

The content of 1,2-vinyl bond of the above-mentioned conjugated diene polymer is preferably not more than 0.5% by mass, more preferably not more than 0.4% by mass, further preferably not more than 0.3% by mass. When the content exceeds 0.5% by mass, physical properties of a rubber such as breaking resistance tend to be deteriorated. Further, the content of 1,2-vinyl bond of the above-mentioned conjugated diene polymer is preferably not less than 0.001% by mass, more preferably not less than 0.01% by mass. In addition, herein the content of 1,2-vinyl bond is a value calculated from signal strengths measured by an NMR analysis.

The alkoxysilane compound to be used for the above-mentioned modification step (A) (hereinafter also referred to as "a modifying agent") is one having two or more reaction groups including an alkoxysilyl group. The reaction groups other than the alkoxysilyl group are not limited particularly, and for example, at least one functional group selected from the group consisting of (iv): an epoxy group, (v): an isocyanate group, (vi): a carbonyl group and (vii): a cyano group. Namely, the above-mentioned alkoxysilane compound having at least one functional group selected from the group consisting of (iv): an epoxy group, (v): an isocyanate group, (vi): a carbonyl group and (vii): a cyano group is also one of the suitable embodiments of the present invention. In addition, the above-mentioned alkoxysilane compound may be a partially condensation product or may be a mixture of the alkoxysilane compound and the partially condensation product.

Here, "partially condensation product" means a compound in which a part (namely, not all) of the SiOR (OR represents an alkoxy group) is formed into an SiOSi bond by the condensation. In addition, preferred as the conjugated diene polymer to be used for the above-mentioned modification reaction is one in which at least 10% of polymer chains have a living property.

Examples of the suitable alkoxysilane compound having (iv): an epoxy group (hereinafter also referred to as "epoxy group-containing alkoxysilane compound") include 2-glycidoxyethyltrimethoxysilane, 2-glycidoxyethyltriethoxysilane, (2-glycidoxyethyl)methyldimethoxysilane, 3-glycidoxypropyltrimethoxysilane, 3-glycidoxypropyltriethoxysilane, (3-glycidoxypropyl)methyldimethoxysilane, 2-(3,4-epoxycyclohexyl)ethyltrimethoxysilane, 2-(3,4-epoxycyclohexyl)ethyltriethoxysilane and 2-(3,4-epoxycyclohexyl)ethyl(methyl)dimethoxysilane. Among these, 3-glycidoxypropyltrimethoxysilane and 2-(3,4-epoxycyclohexyl)ethyltrimethoxysilane are preferable.

Further, examples of the alkoxysilane compound having (v): an isocyanate group (hereinafter also referred to as "isocyanate group-containing alkoxysilane compound") include 3-isocyanatopropyltrimethoxysilane, 3-isocyanatopropyltriethoxysilane, 3-isocyanatopropylmethyldiethoxysilane, 3-isocyanatopropyltriisopropoxysilane, and the like, and among these, 3-isocyanatopropyltrimethoxysilane is particularly preferable.

Also, examples of the alkoxysilane compound having (vi): a carbonyl group (hereinafter also referred to as "carbonyl group-containing alkoxysilane compound") include 3-methacryloyloxypropyltriethoxysilane, 3-methacryloyloxypropyltrimethoxysilane, 3-methacryloyloxypropylmethyldiethoxysilane, 3-methacryloyloxypropyltriisopropoxysilane, and the like, and among these, 3-methacryloyloxypropyltrimethoxysilane is particularly preferable.

Further, examples of the alkoxysilane compound having (vii): a cyano group (hereinafter also referred to as "cyano group-containing alkoxysilane compound") include 3-cyanopropyltriethoxysilane, 3-cyanopropyltrimethoxysilane, 3-cyanopropylmethyldiethoxysilane, 3-cyanopropyltriisopropoxysilane, and the like, and among these, 3-cyanopropyltrimethoxysilane is particularly preferable.

Among these, particularly preferred as the modifying agent are 3-glycidoxypropyltrimethoxysilane, 2-(3,4-epoxycyclohexyl)ethyltrimethoxysilane, 3-isocyanatopropyltrimethoxysilane, 3-methacryloyloxypropyltrimethoxysilane and 3-cyanopropyltrimethoxysilane, and 3-glycidoxypropyltrimethoxysilane is most preferable. These modifying agents may be used alone or may be used in combination of two or more thereof. Further, a partially condensation product of the above-mentioned alkoxysilane compounds can also be used.

An amount of the above-mentioned alkoxysilane compound to be used in the modification reaction of the modification step (A) is preferably 0.01 to 200 mol, more preferably 0.1 to 150 mol to one mol of the above-mentioned Component (i). When the amount is less than 0.01 mol, the modification reaction does not advance sufficiently, and dispersion of a filler is not improved fully. Therefore, sufficient mechanical property, abrasion resistance and low heat build-up property may not be obtained after the vulcanization. On the other hand, even in the case of use of the alkoxysilane compound in an amount exceeding 200 mol, there is a case where the modification reaction has been saturated, and in that case, it will cost excessively. In addition, while a method of adding the above-mentioned modifying agent is not limited particularly, there are a method of adding batchwise, a method of adding dividedly, a method of adding continuously, and the like, and among these, the method of adding batchwise is preferable.

It is preferable to carry out the modification reaction in a solution, and the solution which was used for the polymerization and contains an unreacted monomer can be used as it is. A manner of the modification reaction is not limited particularly, and a batch type reactor may be used or the reaction may be conducted continuously using equipment such as a multi-stage continuous reactor or an in-line mixer. Further, it is preferable to conduct this modification reaction after completion of the polymerization reaction, but before performing desolvation treatment, water treatment, heat treatment, various operations necessary for isolation of the polymer.

A modification reaction temperature can be the same as the polymerization temperature for the polymerization of the conjugated diene polymer. Specifically, the temperature is preferably 20° C. to 100° C., more preferably 30° C. to 90° C. When the temperature is lower than 20° C., a viscosity of the polymer tends to increase, and when the temperature exceeds 100° C., an active terminal of the polymer may be deactivated.

Further, a reaction time in the modification reaction is preferably from five minutes to five hours, more preferably from 15 minutes to one hour. In addition, in the condensation step (B), a conventional antioxidant and a conventional reaction terminator, as desired, may be added after introducing a residue of the alkoxysilane compound into the active terminal of the polymer.

In the modification step (A), in addition to the above-mentioned modifying agent, it is preferable to add a compound which is consumed by a condensation reaction with the alkoxysilane compound residue being a modifying agent introduced into the active terminal, in the condensation step (B). Specifically it is preferable to add a functional group-introducing agent. This functional group-introducing agent can enhance abrasion resistance of the modified conjugated diene polymer.

The functional group-introducing agent is not limited particularly as far as it does not cause a direct reaction with the active terminal substantially and remains in the reaction system as an unreacted product. For example, preferred is an alkoxysilane compound different from the alkoxysilane compound to be used as the above-mentioned modifying agent, namely an alkoxysilane compound having at least one functional group selected from the group consisting of (viii): an amino group, (ix): an imino group and (x): a mercapto group. In addition, the alkoxysilane compound to be used as the functional group-introducing agent may be a partially condensation product or may be a mixture of an alkoxysilane compound to be used as the functional group-introducing agent, which is not a partially condensation product, and the above-mentioned partially condensation product.

Examples of the functional group-introducing agent include, as the alkoxysilane compound having (viii): an amino group (hereinafter also referred to as "amino group-containing alkoxysilane compound"), 3-dimethylaminopropyl(triethoxy)silane, 3-dimethylaminopropyl(trimethoxy)silane, 3-diethylaminopropyl(triethoxy)silane, 3-diethylaminopropyl(trimethoxy)silane, 2-dimethylaminoethyl(triethoxy)silane, 2-dimethylaminoethyl(trimethoxy)silane, 3-dimethylaminopropyl(diethoxy)methylsilane, 3-dibutylaminopropyl(triethoxy)silane, 3-aminopropyltrimethoxysilane, 3-aminopropyltriethoxysilane, aminophenyltrimethoxysilane, aminophenyltriethoxysilane, 3-(N-methylamino)promethoxysltrimethoxysilane, 3-(N-methylamino)propyltriethoxysilane, 3-(1-pyrrolidinyl)propyl(triethoxy)silane, 3-(1-pyrrolidinyl)propyl(trimethoxy)silane, N-(1,3-dimethylbutylidene)-3-(triethoxysilyl)-1-propanamine, N-(1,3-dimethylethylidene)-3-(triethoxysilyl)-1-propanamine, N-ethylidene-3-triethoxysilyl)-1-propanamine, N-(1-methylpropylidene)-3-(triethoxysilyl)-1-propanamine, N-(4-N, N-dimethylaminobenzylidene)-3-(triethoxysilyl)-1-propanamine, N-(cyclohexylidene)-3-(triethoxysilyl)-1-propanamine, and trimethoxysilyl compounds, methyldiethoxysilyl compounds, ethyldiethoxysilyl compounds, methyldimethoxysilyl compounds or ethyldimethoxysilyl compounds corresponding to the above-mentioned triethoxysilyl compounds, and among these, 3-diethylaminopropyl(triethoxy) silane, 3-dimethylaminopropyl(triethoxy)silane, 3-aminopropyltriethoxysilane, N-(1-methylpropylidene)-3-(triethoxysilyl)-1-propanamine and N-(1,3-dimethylbutylidene)-3-(triethoxysilyl)-1-propanamine are particularly preferable.

Further, examples of the suitable alkoxysilane compound having (ix): an imino group (hereinafter also referred to as "imino group-containing alkoxysilane compound") include 3-(1-hexamethyleneimino)propyl(triethoxy)silane, 3-(1-hexamethyleneimino)propyl(trimethoxy)silane, (1-hexamethyleneimino)methyl(trimethoxy)silane, (1-hexamethyleneimino)methyl(triethoxy)silane, 2-(1-hexamethyleneimino)ethyl(triethoxy)silane, 2-(1-hexamethyleneimino)ethyl(trimethoxy)silane, 3-(1-heptamethyleneimino)propyl(triethoxy)silane, 3-(1-dodecamethyleneimino)propyl(triethoxy)silane, 3-(1-hexamethyleneimino)propyl(triethoxy)methylsilane, 3-(1-hexamethyleneimino)propyl(diethoxy)methylsilane, 1-[3-(triethoxysilyl)propyl]-4,5-dihydroimidazole, 1-[3-(trimethoxysilyl)propyl]-4,5-dihydroimidazole, 3-[10-(triethoxysilyl)decyl]-4-oxazoline, N-(3-isopropoxysilylpropyl)-4,5-dihydroimidazole and N-(3-methyldiethoxysilylpropyl)-4,5-dihydroimidazole, and among these, 3-(1-hexamethyleneimino)propyl(triethoxy) silane, 3-(1-hexamethyleneimino)propyl(triethoxy)silane, (1-hexamethyleneimino)methyl(trimethoxy)silane, 1-[3-(triethoxysilyl)propyl])-4,5-dihydroimidazole, 1-[3-(trimethoxysilyl)propyl]-4,5-dihydroimidazole and N-(3-triethoxysilylpropyl)-4,5-dihydroimidazole are more preferable.

Further, examples of the alkoxysilane compound having (x): a mercapto group (hereinafter also referred to as "mercapto group-containing alkoxysilane compound") include 3-mercaptopropyltriethoxysilane, 3-mercaptopropyltrimethoxysilane, 2-mercaptoethyltriethoxysilane, 2-mercaptoethyltrimethoxysilane, 3-mercaptopropyl(diethoxy)methylsilane, 3-mercaptopropyl(monoethoxy)dimethylsilane, mercaptophenyltrimethoxysilane, mercaptophenyltriethoxysilane, and the like, and among these, 3-mercaptopropyltriethoxysilane is particularly preferable.

Among these, particularly preferred as the functional group-introducing agent are 3-diethylaminopropyl(triethoxy)silane, 3-dimethylaminopropyl(triethoxy)silane, 3-aminopropyltriethoxysilane, 3-(1-hexamethyleneimino)propyl(triethoxy)silane, N-(1-methylpropylidene)-3-(triethoxysilyl)-1-propanamine, N-(1,3-dimethylbutylidene)-3-(triethoxysilyl)-1-propanamine, 3-(1-hexamethyleneimino)propyl(triethoxy)silane, (1-hexamethyleneimino)methyl(trimethoxy)silane, 1-[3-(triethoxysilyl)propyl]-4,5-dihydroimidazole, 1-[3-(trimethoxysilyl)propyl]-4,5-dihydroimidazole, N-(3-triethoxysilylpropyl)-4,5- dihydroimidazole and 3-mercaptopropyltriethoxysilane, and 3-aminopropyltriethoxysilane is most preferable. These functional group introducing agents may be used alone or may be used in combination of two or more thereof.

When the alkoxysilane compound is used as the functional group-introducing agent, its amount is preferably 0.01 to 200 mol, more preferably 0.1 to 150 mol to one mol of the above-mentioned Component (i). When the amount is less than 0.01 mol, the condensation reaction does not advance sufficiently, and dispersion of a filler is not improved fully. Therefore, there is a case where mechanical property, abrasion resistance and low heat build-up property after the vulcanization may be inferior. On the other hand, even in the case of use of the alkoxysilane compound in an amount exceeding 200 mol, there is a case where the condensation reaction is saturated, and in that case, it will cost excessively.

A timing of addition of the functional group-introducing agent is preferably after the introduction of the residue of the alkoxysilane compound into the active terminal of the conjugated diene polymer in the modification step (A) and before the initiation of the condensation reaction of the condensation step (B). When the functional group-introducing agent is added after the initiation of the condensation reaction, there is a case where the functional group-introducing agent is not dispersed uniformly and catalytic performance is deteriorated. Specifically the timing of addition of the functional group-introducing agent is preferably from five minutes to five hours after the initiation of the modification reaction, more preferably from 15 minutes to one hour after the initiation of the modification reaction.

In addition, when the alkoxysilane compound having the above-mentioned functional group is used as the functional group-introducing agent, the modification reaction occurs between the conjugated diene polymer having an active terminal and the substantially stoichiometric amount of modifying agent added to the reaction system, and alkoxysilyl groups are introduced into substantially all of the active terminals. Further the addition of the above-mentioned functional group-introducing agent results in the introduction of the residues of the alkoxysilane compound more than the equivalent of the active terminals of the conjugated diene polymer.

From the viewpoint of a reaction efficiency, it is preferable that the condensation reaction between the alkoxysilyl groups occurs between the free alkoxysilane compound and the alkoxysilyl group at the terminal of the conjugated diene polymer and in some cases, between the alkoxysilyl groups at the terminals of the conjugated diene polymer, and the reaction between the free alkoxysilane compounds is not preferable. Therefore, when an alkoxysilane compound is added anew as the functional group-introducing agent, it is preferable that hydrolyzability of the alkoxysilyl group thereof is lower than the hydrolyzability of the alkoxysilyl group introduced into the terminal of the conjugated diene polymer.

For example, preferred is a combination such that a compound having a trimethoxysilyl group having high hydrolyzability is used as the alkoxysilane compound to be used for the reaction with the active terminal of the conjugated diene polymer, and a compound having an alkoxysilyl group (e.g. a triethoxysilyl group) having hydrolyzability lower than that of the trimethoxysilyl group-containing compound is used as the alkoxysilane compound to be newly added as the functional group-introducing agent. On the contrary, for example, when the triethoxysilyl group-containing compound is used as the alkoxysilane compound for the reaction with the active terminal of the conjugated diene polymer, and the alkoxysilane compound to be newly added as the functional group-introducing agent is a trimethoxysilyl group-containing compound, reaction efficiency may be deteriorated.

The condensation step (B) is a step for condensation reaction of a residue of the alkoxysilane compound introduced into the active terminal in the presence of a condensation catalyst comprising at least one element selected from the group consisting of elements of group 4, group 12, group 13, group 14 and group 15 of the Periodic Table.

The condensation catalyst is not limited particularly as far as it comprises at least one element selected from the group consisting of elements of group 4, group 12, group 13, group 14 and group 15 of the Periodic Table. It is preferable that the condensation catalyst comprises at least one element selected from the group consisting of titanium (Ti) (group 4), tin (Sn) (group 14), zirconium (Zr) (group 4), bismuth (Bi) (group 15) and aluminum (Al) (group 13).

Examples of the condensation catalyst comprising tin (Sn) include tin bis(n-octanoate), tin bis(2-ethylhexanoate), tin bis(laurate), tin bis(naphthoate), tin bis(stearate), tin bis(oleate), dibutyltin diacetate, dibutyltin di-n-octanoate, dibutyltin di-2-ethylhexanoate, dibutyltin dilaurate, dibutyltin maleate, dibutyltin bis(benzylmaleate), dibutyltin bis(2-ethylhexylmaleate), di-n-octyltin diacetate, di-n-octyltin di-n-octanoate, di-n-octyltin di-2-ethylhexanoate, di-n-octyltin dilaurate, di-n-octyltin maleate, di-n-octyltin bis(benzylmaleate), di-n-octyltin bis(2-ethylhexylmaleate), and the like.

Examples of the condensation catalyst comprising zirconium (Zr) include tetraethoxyzirconium, tetra-n-propoxyzirconium, tetra-i-propoxyzirconium, tetra-n-butoxyzirconium, tetra-sec-butoxyzirconium, tetra-tert-butoxyzirconium, tetra(2-ethylhexyloxide)zirconium, zirconium tributoxystearate, zirconium tributoxyacetylacetonate, zirconium dibutoxybis(acetylacetonate), zirconium tributoxyethylacetoacetate, zirconium butoxyacetylacetonatebis(ethylacetoacetate), zirconium tetrakis(acetylacetonate), zirconium diacetylacetonatebis(ethylacetoacetate), zirconium bis(2-ethylhexanoate) oxide, zirconium bis(laurate) oxide, zirconium bis(naphthenate) oxide, zirconium bis(stearate) oxide, zirconium bis(oleate) oxide, zirconium bis(linoleate) oxide, zirconium tetrakis(2-ethylhexanoate), zirconium tetrakis(laurate), zirconium tetrakis(naphthenate), zirconium tetrakis(stearate), zirconium tetrakis(oleatoe, zirconium tetrakis(linoleate), and the like.

Examples of the condensation catalyst comprising bismuth (Bi) include bismuth tris(2-ethylhexanoate), bismuth tris(laurate), bismuth tris(naphthenate), bismuth tris(stearate), bismuth tris(oleate), and bismuth tris(linoleate).

Examples of the condensation catalyst comprising aluminum (Al) include triethoxyaluminum, tri-n-propoxyaluminum, tri-i-propoxyaluminum, tri-n-butoxyaluminum, tri-sec-butoxyaluminum, tri-tert-butoxyaluminum, tri(2-ethylhexyloxide)aluminum, aluminum dibutoxystearate, aluminum dibutoxyacetylacetonate, aluminum butoxybis(acetylacetonate), aluminum dibutoxyethylacetoacetate, aluminum tris(acetylacetonate), aluminum tris(ethylacetoacetate), aluminum tris(2-ethylhexanoate), aluminum tris(laurate), aluminum tris(naphthenate), aluminum tris(stearate), aluminum tris(oleate), aluminum tris(linoleate), and the like.

Examples of the condensation catalyst comprising titanium (Ti) include tetramethoxytitanium, tetraethoxytitanium, tetra-n-propoxytitanium, tetra-i-propoxytitanium, tetra-n-butoxytitanium, tetra-n-butoxytitanium oligomer, tetra-sec-butoxytitanium, tetra-tert-butoxytitanium, titanium tetra(2-ethylhexyloxide), titanium bis(octanedioleate)bis(2-ethylhexyloxide), titanium tetra(octanedioleate), titanium lactate, titanium dipropoxybis(triethanolaminate), titanium dibutoxybis(triethanolaminate), titanium tributoxystearate, titanium tripropoxystearate, titanium tripropoxyacetylacetonate, titanium dipropoxybis(acetylacetonate), titanium tripropoxyethylacetoacetate, titanium propoxyacetylacetonatebis(ethylacetoacetate), titanium tributoxyacetylacetonate, titanium dibutoxybis(acetylacetonate), titanium tributoxyethylacetoacetate, titanium dibutoxyacetylacetonatebis(ethylacetoacetate), titanium tetrakis(acetylacetonate), titanium diacetylacetonatebis(ethylacetoacetate), titanium oxide bis(2-ethylhexanoate), titanium oxide bis(laurate), titanium oxide bis(naphthenate), titanium oxide bis(stearate), titanium oxide bis(oleate), titanium oxide bis(linoleate), titanium tetrakis(2-ethylhexanoate), titanium tetrakis(laurate), titanium tetrakis(naphthenate), titanium tetrakis(stearate), titanium tetrakis(oleate), titanium tetrakis(linoleate), and the like.

Among these, the condensation catalysts comprising titanium (Ti) are more preferable as the above-mentioned condensation catalyst. Among the condensation catalysts comprising titanium (Ti), alkoxides, carboxylates or acetylacetonate complex salts of titanium (Ti) are further preferable. Particularly preferred is tetra-i-propoxytitanium (tetraisopropyltitanate). By the use of the condensation catalyst comprising titanium (Ti), the condensation reaction of the residue of the alkoxysilane compound to be used as the modifying agent and the residue of the alkoxysilane compound to be used as the functional group-introducing agent can be accelerated more effectively, which makes it possible to obtain the modified conjugated diene polymer having good processability, low temperature property and abrasion resistance. Thus, the above-mentioned condensation catalyst comprising titanium (Ti) is also one of the suitable embodiments of the present invention.

With respect to an amount of the condensation catalyst, the number of moles of the various compounds which can be used as the condensation catalysts is preferably from 0.1 to 10 mol, particularly preferably from 0.3 to 5 mol to one mol of the total amount of alkoxysilyl groups being present in the reaction system. When the number of moles is less than 0.1 mol, the condensation reaction may not advance sufficiently. On the other hand, even when more than 10 mol of the condensation catalyst is used, there is a case where the effect of the condensation catalyst is saturated, and in that case, it will cost excessively.

While the condensation catalyst can be added before the above-mentioned modification reaction, it is preferable to add it after the modification reaction and before the initiation of the condensation reaction. When the condensation catalyst is added before the modification reaction, a direct reaction with the active terminal occurs and there is a case where an alkoxysilyl group cannot be introduced into the active terminal. Further, when the condensation catalyst is added after the initiation of the condensation reaction, there is a case where the condensation catalyst is not dispersed uniformly and catalyst performance is deteriorated. Specifically a timing of addition of the condensation catalyst is preferably from five minutes to five hours after the initiation of the modification reaction, more preferably from 15 minutes to one hour after the initiation of the modification reaction.

It is preferable to conduct the condensation reaction of the condensation step (B) in an aqueous solution, and a condensation reaction temperature is preferably from 85° C. to 180° C., more preferably from 100° C. to 170° C., particularly preferably from 110° C. to 150° C. When the condensation reaction temperature is lower than 85° C., there is a case where the condensation reaction is not advanced sufficiently and cannot be completed. In that case, a change over time occurs on the obtained modified conjugated diene polymer, which may be a problem with quality. On the other hand, when the condensation reaction temperature exceeds 180° C., aging reaction of the polymer advances, which may deteriorate physical properties of the polymer.

A pH value of the aqueous solution in which the condensation reaction is conducted is preferably from 9 to 14, more preferably from 10 to 12. When the pH value of the aqueous solution is within such a range, the condensation reaction is accelerated, and stability over time of the modified conjugated diene polymer can be improved. When the pH value is less than 9, there is a case where the condensation reaction is not advanced sufficiently and cannot be completed. In that case, a change over time occurs on the obtained modified conjugated diene polymer, which may be a problem with quality. On the other hand, when the pH value of the aqueous solution in which the condensation reaction is conducted exceeds 14, a large amount of a component derived from alkali remains in the modified conjugated diene polymer after isolation thereof, and removal of such a component may be difficult.

A reaction time of the condensation reaction is preferably from five minutes to ten hours, more preferably from about 15 minutes to about five hours. When the reaction time is less than five minutes, the condensation reaction may not be completed. On the other hand, even when the reaction time exceeds ten hours, the condensation reaction might have been saturated. Further, a pressure inside a reaction system during the condensation reaction is preferably from 0.01 to 20 MPa, more preferably from 0.05 to 10 MPa.

A manner of the condensation reaction is not limited particularly, and a batch type reactor may be used or condensation reaction may be conducted continuously using equipment such as a multi-stage continuous reactor. Further, desolvation may be performed at the same time as the condensation reaction.

As mentioned above, the targeted modified conjugated diene polymer can be obtained by conducting well-known post-treatment after the condensation reaction.

A Mooney viscosity ($ML_{1+4}$(125° C.)) of the modified conjugated diene polymer is preferably from 10 to 150, more preferably from 20 to 100. When the Mooney viscosity ($ML_{1+4}$(125° C.)) is less than 10, physical properties of a rubber such as breaking resistance may be deteriorated. On the other hand, when the Mooney viscosity ($ML_{1+4}$(125° C.)) exceeds 150, workability may be deteriorated and kneading with the compounding agents may be difficult. In addition, the Mooney viscosity ($ML_{1+4}$(125° C.)) is a value obtained by the measuring method described in Example explained later.

A molecular weight distribution (Mw/Mn) of the modified conjugated diene polymer is preferably 3.5 or less, more preferably 3.0 or less, further preferably 2.5 or less. When the molecular weight distribution is more than 3.5, physical properties of a rubber such as breaking resistance and low heat build-up property tend to be deteriorated. Here, the weight-average molecular weight (Mw) of the modified conjugated diene polymer is a weight-average molecular weight measured with a GPC method (gel permeation chromatography method) and calculated in terms of polystyrene. Further, the number-average molecular weight (Mn) of the modified conjugated diene polymer is a number-average molecular weight obtained by measuring with a GPC method and calculating in terms of polystyrene.

Further, a cold flow (mg/min) is preferably not more than 1.0, more preferably not more than 0.8. When the cold flow exceeds 1.0, form stability of the polymer during the storage may be deteriorated. In addition, herein the cold flow (mg/min) is a value calculated by a measuring method explained later.

Further, an evaluation value of the stability over time is preferably from 0 to 5, more preferably from 0 to 2. When the evaluation value exceeds 5, a change over time of the polymer may occur during the storage. In addition, herein the stability over time is a value calculated by a measuring method explained later.

Further, a glass transition temperature of the above-mentioned modified conjugated diene polymer is preferably not more than −40° C., more preferably not more than −43° C., further preferably not more than −46° C., particularly preferably not more than −50° C. When the glass transition temperature exceeds −40° C., low temperature property required for a studless tire may not be secured sufficiently. On the other hand, a lower limit of the glass transition temperature is not limited particularly. Here, the glass transition temperature of the modified conjugated diene polymer can be measured by a measuring method described in Example explained later.

An amount of silica to be compounded in the kneading step X1 is preferably not less than 40 parts by mass, more preferably not less than 50 parts by mass based on 100 parts by mass of the modified conjugated diene polymer. When the amount of silica is not less than 40 parts by mass, a sufficient effect of localizing the silica in the A phase comprising the modified conjugated diene polymer tends to be obtained. Further, the amount of silica to be compounded in the kneading step X1 is preferably not more than 100 parts by mass, more preferably not more than 80 parts by mass based on 100 parts by mass of the modified conjugated diene polymer. When the amount of silica is not more than 100 parts by mass, dispersion of the silica is easy, and processability can be made satisfactory.

The silica is not limited particularly, and usual ones in tire industries, for example, silica (silicic acid anhydride) prepared by a dry method, silica (hydrous silicic acid) prepared by a wet method, and the like can be used.

A nitrogen adsorption specific surface area ($N_2SA$) of silica is preferably not less than 70 $m^2$/g, more preferably not less than 140 $m^2$/g. When silica has $N_2SA$ of not less than 70 $m^2$/g, sufficient reinforcing property can be obtained and breaking resistance and abrasion resistance can be made satisfactory. The $N_2SA$ of silica is preferably not more than 220 $m^2$/g, more preferably not more than 200 $m^2$/g. When the $N_2SA$ of silica is not more than 220 $m^2$/g, dispersion of the silica is easy and processability can be made satisfactory. Herein, the $N_2SA$ of silica is a value measured by a BET method in accordance with ASTM D3037-81.

In the kneading step X1, it is preferable to knead a silane coupling agent together with the silica. The silane coupling agent is not particularly limited, and any silane coupling agents which have been used in rubber industries in combination with silica can be used. Examples thereof include sulfide silane coupling agents such as bis(3-triethoxysilylpropyl)tetrasulfide, bis(2-triethoxysilylethyl)tetrasulfide, bis(3-trimethoxysilylpropyl)tetrasulfide, bis(2-trimethoxysilylethyl)tetrasulfide, bis(3-triethoxysilylpropyl)trisulfide, bis(3-trimethoxysilylpropyl)trisulfide, bis(3-triethoxysilylpropyl)disulfide, bis(3-trimethoxysilylpropyl)disulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 2-trimethoxysilylethyl-N,N-dimethylthiocarbamoyl tetrasulfide, 3-trimethoxysilylpropylbenzothiazolyl tetrasulfide, 3-triethoxysilylpropylbenzothiazole tetrasulfide, 3-triethoxysilylpropyl methacrylate monosulfide, and 3-trimethoxysilylpropyl methacrylate monosulfide; mercapto silane coupling agents such as 3-mercaptopropyltrimethoxysilane, 3-mercaptopropyltriethoxysilane, 2-mercaptoethyltrimethoxysilane, and 2-mercaptoethyltriethoxysilane; vinyl silane coupling agents such as vinyltriethoxysilane and vinyltrimethoxysilane; amino silane coupling agents such as 3-aminopropyltriethoxysilane, 3-aminopropyltrimethoxysilane, 3-(2-aminoethyl)aminopropyltriethoxysilane, and 3-(2-aminoethyl)aminopropyltrimethoxysilane; glycidoxy silane coupling agents such as γ-glycidoxypropyltriethoxysilane, γ-glycidoxypropyltrimethoxysilane, γ-glycidoxypropylmethyldiethoxysilane, and γ-glycidoxypropylmethyldimethoxysilane; nitro silane coupling agents such as 3-nitropropyltrimethoxysilane and 3-nitropropyltriethoxysilane; chloro silane coupling agents such as 3-chloropropyltrimethoxysilane, 3-chloropropyltriethoxysilane, 2-chloroethyltrimethoxysilane, and 2-chloroethyltriethoxysilane; and the like. These silane coupling agents may be used alone or may be used in combination of two or more thereof. Among these, from the view point of good reactivity with silica, sulfide silane coupling agents are preferred, and bis(3-triethoxysilylpropyl)disulfide is particularly preferred.

When the silane coupling agent is compounded, the content thereof is preferably not less than 3 parts by mass, more preferably not less than 6 parts by mass based on 100 parts by mass of silica. The content of silane coupling agent of not less than 3 parts by mass makes it possible to obtain satisfactory breaking strength. The content of silane coupling agent based on 100 parts by mass of silica is preferably not more than 12 parts by mass, more preferably not more than 10 parts by mass. The content of silane coupling agent of not more than 12 parts by mass makes it possible to obtain an effect offsetting increase in cost.

(b) Step of Preparing IR Master Batch (Kneading Step X2)

The IR master batch can be prepared by kneading the IR and silica. The kneading method and the kneading conditions are the same as in the above-mentioned kneading step X1. Further, the IR master batch can be prepared as a wet master batch obtained by mixing an IR latex with a water dispersion of silica in the same manner as in the kneading step X1.

The isoprene rubber (IR) to be used in the present invention is not limited particularly, and usual ones which have been used in rubber industries can be used, and there are, for example, natural rubbers such as SIR20, RSS#3 and TSR20. Further, in the present invention, the isoprene rubber includes a reformed natural rubber, a modified natural rubber, a synthetic isoprene rubber and a modified synthetic isoprene rubber.

An amount of silica compounded in the kneading step X2 is preferably not less than 15 parts by mass, more preferably not less than 30 parts by mass based on 100 parts by mass of the IR. When the compounding amount of silica is not less than 15 parts by mass, a sufficient effect of dispersing the silica can be obtained. Further, the amount of silica compounded in the kneading step X2 is preferably not more than 100 parts by mass, more preferably not more than 80 parts by mass based on 100 parts by mass of the IR. When the compounding amount of silica is not more than 100 parts by mass, dispersing of the silica can be easy and processability can be satisfactory.

The silica to be used in the kneading step X2 is not limited particularly, and is as explained in the X1 kneading step.

In the kneading step X2, too, it is preferable to knead a silane coupling agent together with the silica, and the silane coupling agent is as explained in the kneading step X1.

(c) Step of Kneading Master Batch Comprising Modified Conjugated Diene Polymer and an IR Master Batch (Kneading Step Y)

The master batch comprising the modified conjugated diene polymer and obtained in the kneading step X1 and the IR master batch obtained in the kneading step X2 are kneaded. Regarding the kneading method, a kneader, which is usually used in a rubber industry, such as a Banbury mixer, an open roll or the like can be used in the same manner as in the above-mentioned kneading steps X1 and X2, and the kneading can be carried out under the conditions usually employed in a rubber industry.

A kneading temperature in the kneading step Y is preferably not less than 80° C., more preferably not less than 100° C., further preferably not less than 145° C. When the kneading temperature is not less than 80° C., a reaction of the silane coupling agent with the silica can be fully advanced, and the silica can be dispersed satisfactorily, thereby making it easy to improve performance on snow and ice and abrasion resistance in good balance. Further, the kneading temperature in the kneading step Y is preferably not more than 200° C., more preferably not more than 190° C., further preferably not more than 160° C. When the kneading temperature is not more than 200° C., there is a tendency that increase in a Mooney viscosity can be inhibited and processability can be satisfactory. Furthermore, the temperature of a kneaded product at the time of discharge from the kneader can be from 130° C. to 160° C.

A kneading time in the kneading step Y is not limited particularly, and is usually 30 seconds or more, preferably from 1 to 30 minutes, more preferably from 2 to 6 minutes.

In the process for preparing the vulcanized rubber composition of the present invention, various materials usually used in a rubber industry such as rubber components other than the IR and the modified conjugated diene polymer, carbon black, aluminum hydroxide, a terpene resin, oil, wax, an antioxidant, stearic acid and zinc oxide may be kneaded as needed in the kneading step X1, the kneading step X2, the kneading step Y and other steps in addition to the above-mentioned materials.

Examples of the other rubber components include diene rubbers such as styrene-butadiene rubber.

Examples of carbon black include furnace black, acetylene black, thermal black, channel black, graphite, and the like, and these carbon blacks may be used alone or may be used in combination of two or more thereof. Among these, furnace black is preferable for the reason that low temperature property and abrasion resistance can be improved in good balance. A step of kneading carbon black is not limited particularly, and the X2-kneading is preferable for the reason that the silica is dispersed preferentially in the phase of the modified conjugated diene polymer.

A nitrogen adsorption specific surface area ($N_2SA$) of carbon black is preferably not less than 70 $m^2/g$, more preferably not less than 90 $m^2/g$ from a viewpoint that sufficient reinforcing property and abrasion resistance can be obtained. Further, the $N_2SA$ of carbon black is preferably not more than 300 $m^2/g$, more preferably not more than 250 $m^2/g$ from a viewpoint that dispersion thereof is good and heat generation hardly arises. The $N_2SA$ can be measured according to JIS K 6217-2 "Carbon black for rubber industry—Fundamental characteristics—Part 2: Determination of specific surface area—Nitrogen adsorption methods—Single-point procedures".

When carbon black is compounded, the content thereof is preferably not less than 1 part by mass, more preferably not less than 5 parts by mass based on 100 parts by mass of the total rubber components. When the content of carbon black is not less than 1 part by mass, sufficient reinforcing property tends to be obtained. Further, the content of carbon black is preferably not more than 95 parts by mass, more preferably not more than 60 parts by mass, further preferably not more than 20 parts by mass. When the content of carbon black is not more than 95 parts by mass, good processability is obtained, heat generation can be inhibited, and abrasion resistance can be enhanced.

Oil is not limited particularly, and for example, a process oil, vegetable fats and oils, or a mixture thereof can be used. Examples of process oil include a paraffin process oil, an aromatic process oil, a naphthenic process oil, and the like. Examples of vegetable oils and fats include castor oil, cotton seed oil, linseed oil, rapeseed oil, soybean oil, palm oil, coconut oil, peanut oil, rosin, pine oil, pine tar, tall oil, corn oil, rice oil, safflower oil, sesame oil, olive oil, sunflower oil, palm kernel oil, tsubaki oil, jojoba oil, macadamia nut oil, tung oil, and the like. Among these, process oils are preferred, and particularly use of a paraffin process oil is preferred.

When compounding oils, a content thereof is preferably not less than 15 parts by mass, more preferably not less than 20 parts by mass based on 100 parts by mass of total rubber components. When the oil content is not less than 15 parts by mass, performance on snow and ice required for a studless tire tends to be exhibited. Further, the oil content is preferably not more than 80 parts by mass, more preferably not more than 70 parts by mass. When the oil content is not more than 80 parts by mass, there is a tendency that deterioration of processability, lowering of abrasion resistance and lowering of resistance to aging are prevented.

An anti-oxidant to be compounded in the present invention can be properly selected from amine, phenol and imidazole compounds, and carbamic acid metal salts. These anti-oxidants may be used alone or may be used in combination of two or more thereof. Among them, amine anti-oxidants are preferred for the reason that an ozone resistance can be improved significantly and an effect for exhibiting such a property can be maintained for a long period of time, and N-(1,3-dimethylbutyl)-N'-phenyl-p-phenylenediamine is more preferred.

When the anti-oxidant is compounded, its content is preferably not less than 0.5 part by mass, more preferably not less than 1.0 part by mass, further preferably not less than 1.2 parts by mass based on 100 parts by mass of total rubber components. When the content of anti-oxidant is not less than 0.5 part by mass, sufficient ozone resistance tends to be obtained. Further, the content of anti-oxidant is preferably not more than 8 parts by mass, more preferably not more than 4 parts by mass, further preferably not more than 2.5 parts by mass. When the content of anti-oxidant is not more than 8 parts by mass, there is a tendency that discoloration can be inhibited and bleeding can be inhibited.

Any of wax, stearic acid and zinc oxide which is used usually in rubber industries can be used suitably.

(d) Step of Vulcanizing (Kneading Step F and Vulcanizing Step)

A vulcanizing agent and a vulcanization accelerator as required are kneaded with the kneaded product obtained in the above-mentioned Y-kneading in the kneading step F to obtain a kneaded product (un-vulcanized rubber composition). Then, this un-vulcanized rubber composition is molded into a required form, which is laminated as a tire member, followed by vulcanization in accordance with a known method to obtain the vulcanized rubber composition of the present invention.

In the kneading step F, the kneading is started from about 50° C. when the kneader is cold and from about 80° C. when the kneader is used continuously, and can be performed until the temperature of a kneaded product at the time of discharge from the kneader reaches 95° C. to 110° C.

A vulcanizing temperature is preferably not less than 120° C., more preferably not less than 140° C., and is preferably not more than 200° C., more preferably not more than 180° C., from a viewpoint that the effect of the present invention can be obtained satisfactorily. A vulcanizing time is preferably from 5 to 30 minutes from a viewpoint that the effect of the present invention can be obtained satisfactorily.

A vulcanizing agent is not limited particularly, and those usually used in rubber industries can be used, and sulfur atom-containing vulcanizing agents are preferred and a sulfur powder is used particularly preferably.

A vulcanization accelerator also is not limited particularly, and those usually used in rubber industries can be used.

The vulcanized rubber composition obtained by the above-mentioned process for preparing the vulcanized rubber composition of the present invention comprises the phase comprising a modified conjugated diene polymer and silica (phase A), and the phase comprising an isoprene rubber and silica (phase B), and the phase A and the phase B are incompatible with each other. Herein, "incompatible" means, for example, that an averaged equivalent circle radius of a discontinuous phase in the section of the vulcanized rubber composition is 100 nm or more, and can be easily evaluated, for example, by an image taken with a scanning electron microscope (SEM).

Further, in the vulcanized rubber composition obtained by the process for preparing the vulcanized rubber composition of the present invention, since the abundance ratio $\alpha$ of silica in the phase A satisfies the following Relation 1, abrasion resistance of the vulcanized rubber composition is enhanced, and when the vulcanized rubber composition is used for a tread, performance on ice is also enhanced. Herein "the abundance ratio $\alpha$ of silica in the phase A" is an index indicating how much amount of silica among the total amount of silica in the rubber composition is present in the phase A 100 to 500 hours after completion of the vulcanization step.

$$0.5 \leq \alpha \leq 0.9 \quad \text{(Relation 1)}$$

wherein, $\alpha$=Amount of silica in phase A/(Amount of silica in phase A+Amount of silica in phase B).

Specifically, for example, the vulcanized rubber composition is subjected to surface shaping to obtain a sample. In a photograph of a scanning electron microscope (SEM) from one sample, ten regions of 2 μm×2 μm which do not overlap each other are selected. In each region, an area of silica per unit area and an area of silica in the phase A per unit area are measured to calculate the abundance ratio $\gamma$ of silica in the phase A. When it can be confirmed that a difference between a maximum value and a minimum value of the $\gamma$ in the ten regions is within 10%, an average of the $\gamma$ in the ten regions is specified as $\alpha$.

The abundance ratio $\alpha$ of silica in the phase A is not less than 0.5, preferably not less than 0.6. When the abundance ratio $\alpha$ of silica in the phase A is less than 0.5, there is a tendency that abrasion resistance and performance on ice cannot be expected to be improved and are rather deteriorated. The abundance ratio $\alpha$ of silica in the phase A is not more than 0.9, preferably not more than 0.8. When the abundance ratio $\alpha$ of silica in the phase A is more than 0.9, there is a tendency that particularly abrasion resistance cannot be expected to be improved and is rather deteriorated.

The vulcanized rubber composition obtained by the process for preparing the vulcanized rubber composition of the present invention is one in which the proportion β of the modified conjugated diene polymer satisfies the following Relation 2:

$$0.4 \leq \beta \leq 0.8 \quad \text{(Relation 2)}$$

wherein β=Mass of modified conjugated diene polymer in vulcanized rubber composition/(Mass of modified conjugated diene polymer in vulcanized rubber composition+ Mass of isoprene rubber in vulcanized rubber composition). The mass of the modified conjugated diene polymer in the vulcanized rubber composition and the mass of the isoprene rubber in the vulcanized rubber composition correspond to the contents of the respective rubbers compounded when preparing the vulcanized rubber composition.

The proportion β of the modified conjugated diene polymer is not less than 0.4, preferably not less than 0.5. When the proportion β of the modified conjugated diene polymer is less than 0.4, there is a tendency that enhancement of the obtained performance on ice cannot be expected. Further the proportion β of the modified conjugated diene polymer is not more than 0.8, preferably not more than 0.7. When the proportion β of the modified conjugated diene polymer exceeds 0.8, the content of isoprene rubber becomes smaller and there is a tendency that sufficient breaking strength and abrasion resistance cannot be obtained.

In the vulcanized rubber composition obtained by the process for preparing the vulcanized rubber composition of the present invention, the total content of the modified conjugated diene polymer and the isoprene rubber in the total rubber components is preferably not less than 70% by mass, more preferably not less than 80% by mass, further preferably 90% by mass, particularly preferably 100% by mass. As the total content of the modified conjugated diene polymer and the isoprene rubber is higher, low temperature property is excellent and required performance on snow and ice can be exhibited. Therefore, it is preferable to use rubber components consisting of the modified conjugated diene polymer and the isoprene rubber.

By the above-mentioned process for preparing the vulcanized rubber composition of the present invention, silica which is easily localized in the isoprene polymer can be also localized in the modified conjugated diene polymer, thereby making it possible to disperse silica in the whole vulcanized rubber composition. Thus, performance on ice can be improved by silica without impairing good abrasion resistance of the isoprene rubber, and these performances can be obtained in good balance.

A vulcanized rubber composition according to another embodiment of the present invention is a vulcanized rubber composition having the phase comprising the modified conjugated diene polymer and silica (phase A) and the phase comprising the isoprene rubber and silica (phase B), wherein the phase A and the phase B are incompatible with each other, an abundance ratio α of silica in the phase A 100 to 500 hours after completion of the vulcanization step satisfies the following Relation 1, and the proportion β of the modified conjugated diene polymer satisfies the following Relation 2:

0.5≤α≤0.9 (Relation 1)

0.4≤β≤0.8 (Relation 2)

wherein α=Amount of silica in phase A/(Amount of silica in phase A+Amount of silica in phase B) and β=Mass of modified conjugated diene polymer in vulcanized rubber composition/(Mass of modified conjugated diene polymer in vulcanized rubber composition+Mass of isoprene rubber in vulcanized rubber composition), and the vulcanized rubber composition can be prepared, for example, by the above-mentioned process for preparing the vulcanized rubber composition of the present invention.

The explanation made herein on the vulcanized rubber composition is applicable to not only the above-mentioned vulcanized rubber composition according to one embodiment of the present invention but also the vulcanized rubber composition obtained by the above-mentioned process for preparing the vulcanized rubber composition according to one embodiment of the present invention, and the statements made herein in the explanation on the process for preparing the vulcanized rubber composition according to one embodiment of the present invention relating to compounding ratios of various materials, properties of the obtained vulcanized rubber composition and the like are also applicable to the above-mentioned vulcanized rubber composition according to one embodiment of the present invention.

In the vulcanized rubber composition of the present invention, the modified conjugated diene polymer forms a sea phase and the isoprene rubber forms an island phase and the abundance ratio of silica in the modified conjugated diene polymer is 50% or more. When sufficient localization of silica in the modified conjugated diene polymer is not seen, namely when the abundance ratio of silica in the phase A is less than 0.5, since a hardness of the isoprene rubber as such tends to be larger than that of the modified conjugated diene polymer, a further difference in hardness arises due to location of silica and lowering of abrasion resistance tends to be seen.

It is preferable that the vulcanized rubber composition of the present invention comprises 25 to 120 parts by mass of a filler and 15 to 80 parts by mass of a softening agent based on 100 parts by mass of rubber components comprising the isoprene rubber and the modified conjugated diene polymer.

A content of filler is preferably not less than 25 parts by mass, more preferably not less than 30 parts by mass based on 100 parts by mass of rubber components. When the filler content is not less than 25 parts by mass, there is a tendency that abrasion resistance and breaking resistance become satisfactory. Also, the filler content is preferably not more than 120 parts by mass, more preferably not more than 70 parts by mass. When the filler content is not more than 120 parts by mass, there is a tendency that processability and workability are enhanced and lowering of low temperature property due to an increased amount of filler is prevented. Examples of the filler include silica, carbon black, aluminum hydroxide and the like, and it is preferable that silica is blended in an amount of preferably not less than 50% by mass, more preferably not less than 70% by mass based on the total amount of filler.

The total silica content is preferably not less than 25 parts by mass, more preferably not less than 38 parts by mass, based on 100 parts by mass of the rubber components. When the total silica content is not less than 25 parts by mass, there is a tendency that abrasion resistance and breaking resistance become satisfactory. Further, the total silica content is preferably not more than 100 parts by mass, more preferably not more than 80 parts by mass, based on 100 parts by mass of the rubber components. When the total silica content is not more than 100 parts by mass, there is a tendency that processability and workability are enhanced and lowering of low temperature property due to an increased amount of silica is prevented.

A content of the softening agent is preferably not less than 15 parts by mass, more preferably not less than 20 parts by mass based on 100 parts by mass of the rubber components. When the content of the softening agent is not less than 15 parts by mass, there is a tendency that performance on snow and ice required for a studless tire is exhibited. Also, the content of the softening agent is preferably not more than 80 parts by mass, more preferably not more than 70 parts by mass. When the content of the softening agent is not more than 80 parts by mass, there is a tendency that lowering of processability, lowering of abrasion resistance and deterioration of resistance to aging are prevented. Examples of the softening agent include an aromatic oil, a naphthenic oil, a paraffinic oil, a terpene resin, and the like.

The vulcanized rubber composition according to one embodiment of the present invention and the vulcanized rubber composition obtained by the process for preparing the vulcanized rubber composition according to one embodiment of the present invention can be used for tire application, for example, tire members such as a tread, a carcass, a side wall and a bead as well as other industrial products such as a vibration proof rubber, a belt and a hose. Particularly, from the viewpoint of satisfactory performance on ice and abrasion resistance, the vulcanized rubber composition is used suitably on a tread, and in the case of a tread of two-layer structure comprising a cap tread and a base tread, is suitably used on the cap tread.

The studless tire of the present invention can be produced by a usual method using the vulcanized rubber composition according to one embodiment of the present invention. Namely the rubber composition of the present invention is extrusion-processed into a shape of a tread of a tire in its unvulcanized state, and further, the obtained extruded product is laminated with other tire parts to form an unvulcanized tire on a tire molding machine by a usual forming method. The studless tire of the present invention can be produced by heating and pressurizing this unvulcanized tire in a vulcanizer.

EXAMPLE

The present invention is explained below by means of Examples, but is not limited to only the Examples.

Preparation Example 1: Preparation of Modified Conjugated Diene Polymer (1) Synthesis of Conjugated Diene Polymer A catalytic composition (iodine atom/lanthanoid-containing compound (molar ratio)=2.0) was obtained by subjecting a cyclohexane solution containing 0.18 mmol of neodymium versatate, a toluene solution containing 3.6 mmol of methyl alumoxane, a toluene solution containing 6.7 mmol of diisobutyl aluminum hydride and a toluene solution containing 0.36 mmol of trimethylsilyliodide to reaction and maturation over 60 minutes at 30° C. with 0.90 mmol of 1,3-butadiene. Subsequently, 2.4 kg of cyclohexane and 300 g of 1,3-butadiene were added into a 5 liter autoclave under a nitrogen atmosphere. Then the above catalytic composition was added into the autoclave, followed by 2-hour polymerization reaction at 30° C. to obtain a polymer solution. A reaction conversion ratio of the added 1,3-butadiene rubber was substantially 100%.

Here, in order to measure various physical properties of the conjugated diene polymer (hereinafter also referred to as "polymer") before modification, 200 g of polymer solution was sampled from the above polymer solution, and to this polymer solution was added a methanol solution containing 1.5 g of 2,4-di-tert-butyl-p-cresol to terminate the polymerization reaction. Thereafter, the solvent was removed by steam stripping, followed by drying with rolls of 110° C., and the obtained dried product was used as the polymer.

Various physical properties of the polymer were measured by the following methods. A Mooney viscosity ($ML_{1+4}$(100° C.)) was 12, a molecular weight distribution (Mw/Mn) was 1.6, a content of cis-1,4 bond was 99.2% by mass, and a content of 1,2-vinyl bond was 0.21% by mass.

[Mooney Viscosity ($ML_{1+4}$(100° C.))]

The Mooney viscosity was measured in accordance with JIS K 6300 using an L-rotor under the conditions of one minute of preheating, four minutes of rotor operation time and 100° C. of a temperature.

[Molecular Weight Distribution (Mw/Mn)]

Measurement was carried out under the following conditions using a gel permeation chromatograph (brand name: HLC-8120GPC, available from TOSO CORPORATION) and a differential refractometer as a detector, and molecular weight was calibrated by standard polystyrene.

Column: Two columns of brand name of "GMHHXL" (available from TOSO CORPORATION).
Column temperature: 40° C.
Mobile phase: Tetrahydrofuran
Flor rate: 1.0 ml/min
Sample concentration: 10 mg/20 ml

[Content of Cis-1,4 Bond, Content of 1,2-Vinyl Bond]

A content of cis-1,4 bond and a content of 1,2-vinyl bond were measured by $^1$H-NMR analysis and $^{13}$C-NMR analysis. For NMR analyses, a brand name "EX-270" available from JEOL Ltd. was used. Specifically for the $^1$H-NMR analysis, a ratio of 1,4-bond to 1,2-bond in the polymer was calculated from signal strengths at 5.30 to 5.50 ppm (1,4-bond) and 4.80 to 5.01 ppm (1,2-bond). Further, for the 13C-NMR analysis, a ratio of cis-1,4-bond to trans-1,4-bond in the polymer was calculated from signal strengths at 27.5 ppm (cis-1,4-bond) and 32.8 ppm (trans-1,4-bond). A content of cis-1,4-bond (mass %) and a content of 1,2-vinyl bond (mass %) were obtained from these calculated ratios.

(2) Synthesis of Modified Conjugated Diene Polymer

In order to obtain a modified conjugated diene polymer (hereinafter also referred to as "modified polymer"), the polymer solution of conjugated diene polymer obtained in (1) above was subjected to the following treatment. To the polymer solution kept at a temperature of 30° C. was added a toluene solution containing 1.71 mmol of 3-glycidoxipropyltrimethoxysilane, followed by 30-minute reaction to obtain a reaction solution. Thereafter, to this reaction solution was added a toluene solution containing 1.71 mmol of 3-aminopropyltriethoxysilane, followed by 30-minute stirring. Subsequently, to this reaction solution was added a toluene solution containing 1.28 mmol of tetraisopropyl titanate, followed by 30-minute stirring. Thereafter, in order to terminate the polymerization reaction, thereto was added a methanol solution containing 1.5 g of 2,4-di-tert-butyl-p-cresol, and a resultant solution was used as a modified polymer solution. A yield thereof was 2.5 kg. Then, 20 liter of an aqueous solution adjusted with sodium hydroxide to have a pH value of 10 was added to this modified polymer solution, followed by condensation reaction as well as removal of a solvent over two hours at 110° C. Thereafter, drying was conducted with rolls of 110° C. to obtain a dried product as a modified polymer.

Various physical properties of the modified polymer were measured by the following methods (It should be noted that a molecular weight distribution (Mw/Mn) was measured under the same conditions as in the above polymer). A Mooney viscosity ($ML_{1+4}$(125° C.)) was 46, a molecular weight distribution (Mw/Mn) was 2.4, a cold flow was 0.3 mg/min, stability over time was 2, and a glass transition temperature was −106° C.

[Mooney Viscosity ($ML_{1+4}$(125° C.))]

The Mooney viscosity was measured in accordance with JIS K 6300 using an L-rotor under the conditions of one minute of preheating, four minutes of rotor operation time and 125° C. of a temperature.

[Cold Flow]

The cold flow was measured by passing and flowing out the polymer through a ¼ inch orifice at a pressure of 3.5 lb/in$^2$ and a temperature of 50° C. After allowing to stand for 10 minutes to obtain a stationary state, a flowing-out speed was measured, and a measured value was shown by milligram per minute (mg/min).

[Stability Over Time]

Stability over time is shown by a value obtained by measuring a Mooney viscosity ($ML_{1+4}$(125° C.)) after keeping the polymer for two days in a thermostatic bath at 90° C. and calculating from the following formula. The smaller the value is, the more satisfactory the stability over time is.

[Mooney viscosity($ML_{1+4}$(125° C.)) after keeping the polymer for two days in thermostatic bath at 90° C.]−[Mooney viscosity ($ML_{1+4}$(125° C.)) measured immediately after synthesis]    Formula:

[Glass Transition Temperature]

The glass transition temperature was obtained as a glass transition starting temperature by measuring in accordance with JIS K 7121 using a differential scanning calorimeter (Q200) available from TA Instruments, Japan while heating up at a temperature elevating rate of 10° C./min.

Various kinds of chemicals used in Examples and Comparative Examples are collectively shown below.

Modified conjugated diene polymer (modified BR): Modified conjugated diene polymer prepared in Preparation Example 1

Butadiene rubber (BR): BR730 available from JSR Corporation (cis-1,4 content: 95%)

Isoprene rubber (IR): Natural rubber (NR) (RSS#3)

Carbon black: DIABLACK I (ISAF carbon, $N_2SA$: 114 m$^2$/g, average particle size: 23 nm) available from Mitsubishi Chemical Corporation Silica: ULTRASIL (registered trade mark) VN3 ($N_2SA$: 175 m$^2$/g) available from EVONIK INDUSTRIES AG Silane coupling agent: Si266 available from EVONIK INDUSTRIES AG Mineral oil: PS-32 (paraffinic process oil) available from Idemitsu Kosan Co., Ltd.

Stearic acid: Stearic acid "Kiri" available from NOF CORPORATION

Zinc oxide: Zinc oxide II available from MITSUI MINING & SMELTING CO., LTD.

Antioxidant: NOCRAC 6C (N-(1,3-dimethylbutyl)-N-phenyl-p-phenylenediamine) available from OUCHI SHINKO CHEMICAL INDUSTRIAL CO., LTD.
Wax: Ozoace wax available from NIPPON SEIRO CO., LTD.
Sulfur: Sulfur powder available from TSURUMI CHEMICAL INDUSTRY CO., LTD.
Vulcanization accelerator NS: NOCCELER NS (N-tert-butyl-2-benzothiazolylsulfenamide) available from OUCHI SHINKO CHEMICAL INDUSTRIAL CO., LTD.
Vulcanization accelerator DPG: NOCCELER D (1,3-diphenylguanidine) available from OUCHI SHINKO CHEMICAL INDUSTRIAL CO., LTD.

Examples 1 to 5 and Comparative Examples 1 to 4

According to the formulation shown in step (I) of Table 1, rubber components, silica and other materials were kneaded for three minutes with a 1.7 liter Banbury mixer at the compound temperature at the time of discharge from the mixer of 150° C. to obtain each of kneaded product comprising the modified conjugated diene polymer and silica (modified conjugated diene polymer master batches) and kneaded product comprising the isoprene rubber and silica (IR master batches). Next, the obtained kneaded product and other materials in accordance with the formulation shown in step (II) of Table 1 were kneaded for two minutes at the compound temperature at the time of discharge from the mixer of 150° C. to obtain a kneaded product. To the obtained kneaded product were added sulfur and a vulcanization accelerator in accordance with the formulation shown in step (III) of Table 1, followed by 5-minute kneading at a temperature of 150° C. using an open roll to obtain an un-vulcanized rubber composition. In the case where no compounding amount is described in the step (I) of Table 1, only the step (II) was carried out.

Each of the obtained un-vulcanized rubber compositions was press-vulcanized for 12 minutes at 170° C. using a 0.5 mm thick metal mold to obtain each of vulcanized rubber compositions.

Further, each of the obtained vulcanized rubber compositions was formed into a shape of a cap tread which was then laminated with other tire members, followed by 15-minute vulcanization at 170° C. to produce a studless tire for test (tire size: 195/65R15).

The obtained vulcanized rubber compositions and test studless tires were stored at room temperature, and 200 hours after completion of vulcanization (about one week later), the following tests were performed to evaluate abrasion resistance, performance on ice and localization of silica. Further, with respect to the vulcanized rubber compositions, a state thereof 200 hours after completion of vulcanization was compared with a state thereof one year after completion of vulcanization, and stability over time of a dispersed state of silica was evaluated. Each of test results is shown in Table 1.

<Abrasion Resistance>

An abrasion loss of each vulcanized rubber composition was measured with a Lambourn abrasion testing machine being available from IWAMOTO Quartz OlassLabo Co., Ltd. under the conditions of a surface rotation speed of 50 m/min, a load of 3.0 kg, an amount of falling sand of 15 g/min, and a slip ratio of 20%, and a reciprocal of the abrasion loss was obtained. A reciprocal of the abrasion loss of Comparative Example 1 is assumed to be 100, and reciprocals of other abrasion losses are indicated by indexes. The larger the index is, the more excellent the abrasion resistance is. A performance target value is 110 or more.

<Performance on Ice>

In-vehicle running on ice surface was carried out under the following conditions using studless tires of Examples and Comparative Examples, and performance on ice was evaluated. The test was performed at the test course of Sumitomo Rubber Industries, Ltd. in Nayoro, Hokkaido, and air temperature on snow was −2° C. to −6° C. The test tires were mounted on a 2000 cc domestic FR car, and a lock brake was applied at a speed of 30 km/hr. A stopping distance required for stopping the car after putting on the lock brake was measured, and was indicated by a value calculated by the following equation based on the distance of Comparative Example 1. A performance target value is 106 or more.

(Performance on ice)=(Stopping distance of Comparative Example 1)/(Stopping distance of each compounding formulation)×100

<Evaluation of Morphology and Evaluation of Localization of Silica>

A vulcanized rubber composition was subjected to surface shaping and observed with a scanning electron microscope (SEM). The morphology of each phase could be confirmed by comparison of a contrast. As a result, in Examples and Comparative Examples, it was confirmed that the phase comprising the modified conjugated diene polymer (phase A) and the phase comprising the isoprene rubber (phase B) are incompatible with each other. The phase A formed a sea phase and the phase B formed an island phase, and in Examples, silica was dispersed in both of the phase A and the phase B.

Silica can be observed in the form of particulate. In an SEM photograph of one sample, ten regions of 2 μm×2 μm each which do not overlap each other were selected. In each region, an area of silica per unit area of each phase was measured, and an abundance ratio γ of the silica of the phase A was calculated. After confirming that a difference between the maximum ratio and the minimum ratio among the ratios γ of the ten regions is within 10%, an average of the ratios γ in the ten regions was obtained and indicated by α.

<Stability Over Time of a Dispersed State of Silica>

With respect to the same vulcanized rubber composition, an abundance ratio α of silica in the phase A in a state one year after completion of vulcanization was measured in the same manner as above. Then, a rate of change of the abundance ratio α of silica in the phase A in a state one year after completion of vulcanization to an abundance ratio α of silica in the phase A in a state 200 hours after completion of vulcanization was determined.

Rate of change (%)=[α(one year after)−α(200 hours after)]/α(200 hours after)×100

The stability over time of a dispersed state of silica of each of Examples and Comparative Examples was evaluated in accordance with the following criteria for evaluation. The smaller the rate of change is, the more satisfactory the evaluation result is.

A: Rate of change being within 10%.

B: Rate of change exceeding 10% and not more than 30%.

C: Rate of change exceeding 30%.

TABLE 1

| | Example 1 | | Example 2 | | Example 3 | | Example 4 | | Example 5 | |
|---|---|---|---|---|---|---|---|---|---|---|
| | Modified BR | IR | Modified BR | IR | Modified BR | IR | Modified BR | IR | Modified BR | IR |
| Compounding amount (part by mass) | | | | | | | | | | |
| Step (I) | | | | | | | | | | |
| IR | — | 40 | — | 60 | — | 40 | — | 40 | — | 30 |
| Modified BR | 60 | — | 40 | — | 60 | — | 60 | — | 70 | — |
| BR | — | — | — | — | — | — | — | — | — | — |
| Carbon black | — | 5 | — | 5 | — | 5 | — | 5 | — | 5 |
| Silica | 50 | 10 | 30 | 30 | 45 | 15 | 30 | 30 | 55 | 10 |
| Silane coupling agent | 3 | 1 | 2 | 1 | 3 | 1 | 3 | 1 | 3 | 1 |
| Oil | 15 | 5 | 15 | 5 | 10 | 10 | 10 | 10 | 15 | 5 |
| Step (II) | | | | | | | | | | |
| IR | — | | — | | — | | — | | — | |
| BR | — | | — | | — | | — | | — | |
| Carbon black | — | | — | | — | | — | | — | |
| Silica | — | | — | | — | | — | | — | |
| Silane coupling agent | — | | — | | — | | — | | — | |
| Wax | 1 | | 1 | | 1 | | 1 | | 1 | |
| Antioxidant | 2 | | 2 | | 2 | | 2 | | 2 | |
| Oil | — | | — | | — | | — | | — | |
| Stearic acid | 1 | | 1 | | 1 | | 1 | | 1 | |
| Zinc oxide | 1.5 | | 1.5 | | 1.5 | | 1.5 | | 1.5 | |
| Step (III) | | | | | | | | | | |
| Sulfur | 1 | | 1 | | 1 | | 1 | | 1 | |
| Vulcanization accelerator | 2 | | 2 | | 2 | | 2 | | 2 | |
| Evaluation | | | | | | | | | | |
| Index of abrasion resistance | 115 | | 110 | | 113 | | 112 | | 113 | |
| Index of performance on ice | 120 | | 107 | | 118 | | 107 | | 115 | |
| Abundance ratio of silica in BR phase (α) | 0.8 | | 0.5 | | 0.7 | | 0.5 | | 0.7 | |
| Stability of dispersion of silica | A | | A | | A | | A | | A | |

| | Com. Ex. 1 | | Com. Ex. 2 | | Com. Ex. 3 | | Com. Ex. 4 | |
|---|---|---|---|---|---|---|---|---|
| | | | | | | | Modified BR | IR |
| | BR | IR | BR | IR | BR | IR | BR | IR |
| Compounding amount (part by mass) | | | | | | | | |
| Step (I) | | | | | | | | |
| IR | — | — | — | 40 | — | 60 | — | 10 |
| Modified BR | — | — | — | — | — | — | 90 | — |
| BR | — | — | 60 | — | 40 | — | — | — |
| Carbon black | — | — | — | 5 | — | 5 | — | 5 |
| Silica | — | — | 50 | 10 | 30 | 30 | 50 | 10 |
| Silane coupling agent | — | — | 3 | 1 | 2 | 1 | 3 | 1 |
| Oil | — | — | 15 | 5 | 15 | 5 | 15 | 5 |
| Step (II) | | | | | | | | |
| IR | 40 | | — | | — | | — | |
| BR | 60 | | — | | — | | — | |
| Carbon black | 5 | | — | | — | | — | |
| Silica | 60 | | — | | — | | — | |
| Silane coupling agent | 4 | | — | | — | | — | |
| Wax | 1 | | 1 | | 1 | | 1 | |
| Antioxidant | 2 | | 2 | | 2 | | 2 | |
| Oil | 20 | | — | | — | | — | |
| Stearic acid | 1 | | 1 | | 1 | | 1 | |
| Zinc oxide | 1.5 | | 1.5 | | 1.5 | | 1.5 | |
| Step (III) | | | | | | | | |
| Sulfur | 1 | | 1 | | 1 | | 1 | |
| Vulcanization accelerator | 2 | | 2 | | 2 | | 2 | |
| Evaluation | | | | | | | | |
| Index of abrasion resistance | 100 | | 102 | | 120 | | 107 | |
| Index of performance on ice | 100 | | 122 | | 105 | | 104 | |
| Abundance ratio of silica in BR phase (α) | 0.1 | | 0.7 | | 0.5 | | 0.4 | |
| Stability of dispersion of silica | — | | A | | A | | — | |

From the results shown in Table 1, it is seen that by the process of preparing the two kinds of master batches, one comprising the modified conjugated diene polymer and another one comprising the IR, wherein each of the master batches comprises silica, and then kneading the master batches, the vulcanized rubber composition having a satisfactory abundance ratio α of silica in the modified conjugated diene polymer phase can be prepared, and stability of dispersion of silica is satisfactory. Further, it is seen that the vulcanized rubber composition having such a satisfactory abundance ratio α of silica in the modified conjugated diene polymer phase can improve abrasion resistance and performance on ice in good balance.

EXPLANATION OF SYMBOLS

1 BR phase
2 IR phase
3 Silica
4 Carbon black

The invention claimed is:

1. A vulcanized rubber composition comprising: a phase comprising a modified conjugated diene polymer and silica (phase A), and a phase comprising an isoprene rubber and silica (phase B),
wherein a diene compound constructing said modified conjugated diene polymer is at least one selected from the group consisting of 1,3-butadiene, isoprene and 2,3-dimethyl-1,3-butadiene,
wherein an amount of 1,2-vinyl bond of the conjugated diene polymer is not more than 0.5% by mass,
wherein said modified conjugated diene polymer is comprised as the only modified conjugated diene polymer, and is made from at least one monomer selected from the group consisting of 1,3-butadiene, isoprene, and 2,3-dimethyl-1,3-butadiene,
wherein the phase A and the phase B are incompatible with each other,
an abundance ratio a of silica in the phase A 100 to 500 hours after completion of a vulcanization step satisfies the following Relation 1, and
a proportion β of said modified conjugated diene polymer satisfies the following Relation 2:

$$0.5 \leq \alpha \leq 0.9 \quad \text{(Relation 1)}$$

$$0.5 \leq \beta \leq 0.7 \quad \text{(Relation 2)}$$

wherein α=Amount of silica in phase A/(Amount of silica in phase A+Amount of silica in phase B) and β=Mass of modified conjugated diene polymer in vulcanized rubber composition/(Mass of modified conjugated diene polymer in vulcanized rubber composition+Mass of isoprene rubber in vulcanized rubber composition).

2. The vulcanized rubber composition of claim 1, comprising 25 to 120 parts by mass of a filler and 15 to 80 parts by mass of a softening agent based on 100 parts by mass of the rubber components comprising the isoprene rubber and the modified conjugated diene polymer, wherein the filler comprises not less than 50% by mass of silica based on the total amount of filler.

3. The vulcanized rubber composition of claim 1, wherein the modified conjugated diene polymer is obtained by a process for preparation comprising a modification step (A) for performing a modification reaction by using a conjugated diene polymer having a content of cis-1,4 bond of not less than 98.5% by mass and having an active terminal to introduce an alkoxysilane compound having 2 or more reaction groups including an alkoxysilyl group into the active terminal of the conjugated diene polymer, and a condensation step (B) for condensation reaction of a residue of the alkoxysilane compound introduced into the active terminal in the presence of a condensation catalyst comprising at least one element among elements of group 4A, group 2B, group 3B, group 4B and group 5B of the Periodic Table, wherein the conjugated diene polymer is one prepared by polymerization in the presence of a catalytic composition comprising, as a main component, a mixture of the following components (i) to (iii):

Component (i): Lanthanoid-containing compound comprising at least any one of lanthanoid elements or a reaction product obtained by a reaction of the lanthanoid-containing compound and a Lewis base Component (ii): At least one selected from the group consisting of aluminoxanes and organoaluminum compounds represented by a general formula (1): $ALR^1R^2R^3$, wherein $R^1$ and $R^2$ are the same or different and each is a hydrocarbon group having 1 to 10 carbon atoms or hydrogen atom, $R^3$ is a hydrocarbon group having 1 to 10 carbon atoms and being the same as or different from $R^1$ or $R^2$ Component (iii): Iodine-containing compound having at least one iodine atom in a molecular structure thereof.

4. The vulcanized rubber composition of claim 3, wherein the alkoxysilane compound has at least one functional group selected from the group consisting of the following (iv) to (vii):
(iv): Epoxy group
(v): Isocyanate group
(vi): Carbonyl group
(vii): Cyano group.

5. The vulcanized rubber composition of claim 3, wherein the alkoxysilane compound having at least one functional group selected from the group consisting of the following (viii) to (x) is further added in the modification step (A):
(viii): Amino group
(ix): Imino group
(x): Mercapto group.

6. The vulcanized rubber composition of claim 3, wherein the condensation step (B) is performed in an aqueous solution having a pH value of from 9 to 14 and a temperature of from 85° C. to 180° C.

7. The vulcanized rubber composition of claim 3, wherein the condensation catalyst is a condensation catalyst comprising titanium (Ti).

8. A studless tire comprising a tread composed of the vulcanized rubber composition of claim 1.

9. A process for preparing a vulcanized rubber composition comprising:
(a) a step of preparing a master batch comprising a modified conjugated diene polymer and silica, wherein a diene compound constructing said modified conjugated diene polymer is at least one selected from the group consisting of 1,3-butadiene, isoprene and 2,3-dimethyl-1,3-butadiene, wherein an amount of 1,2-vinyl bonding of the conjugated diene polymer is not more than 0.5% by mass,
(b) a step of preparing a master batch comprising an isoprene rubber and silica,
(c) a step of kneading the master batch obtained in the step (a) and the master batch obtained in the step (b), and
(d) a step of vulcanizing a kneaded product obtained in the step (c),
wherein said modified conjugated diene polymer is comprised as the only modified conjugated diene polymer, and is made from at least one monomer selected from the group consisting of 1,3-butadiene, isoprene, and 2,3-dimethyl-1,3-butadiene, wherein the vulcanized rubber composition comprises:
a phase comprising said modified conjugated diene polymer and silica (phase A), and a phase comprising the isoprene rubber and silica (phase B),
wherein the phase A and the phase B are incompatible with each other,
an abundance ratio α of silica in the phase A 100 to 500 hours after completion of a vulcanization step satisfies the following Relation 1, and
a proportion β of said modified conjugated diene polymer satisfies the following Relation 2:

$$0.5 \leq \alpha \leq 0.9 \quad \text{(Relation 1)}$$

$$0.5 \leq \beta \leq 0.7 \quad \text{(Relation 2)}$$

wherein α=Amount of silica in phase A/(Amount of silica in phase A+Amount of silica in phase B) and β=Mass of modified conjugated diene polymer in vulcanized rubber composition/(Mass of modified conjugated diene polymer in vulcanized rubber composition+Mass of isoprene rubber in vulcanized rubber composition).

10. The process for preparation of claim 9, wherein the master batch comprising the modified conjugated diene polymer and silica comprises not less than 40 parts by mass of silica based on 100 parts by mass of the modified conjugated diene polymer.

11. The process for preparation of claim 9, wherein the master batch comprising the isoprene rubber and silica comprises not less than 15 parts by mass of silica based on 100 parts by mass of the isoprene rubber.

12. The process for preparation of claim 9, wherein the vulcanized rubber composition comprises 25 to 120 parts by mass of a filler and 15 to 80 parts by mass of a softening agent based on 100 parts by mass of a rubber component comprising the isoprene rubber and the modified conjugated diene polymer, and the filler comprises not less than 50% by mass of silica based on a total amount of the filler.

13. The process for preparation of claim 9, wherein the modified conjugated diene polymer is obtained by a process for preparation comprising a modification step (A) for performing a modification reaction by using a conjugated diene polymer having a content of cis-1,4 bond of not less than 98.5% by mass and having an active terminal to introduce an alkoxysilane compound having 2 or more reaction groups including an alkoxysilyl group into the active terminal of the conjugated diene polymer, and a condensation step (B) for condensation reaction of a residue of the alkoxysilane compound introduced into the active terminal in the presence of a condensation catalyst comprising at least one element among elements of group 4A, group 2B, group 3B, group 4B and group 5B of the Periodic Table, wherein the conjugated diene polymer is one prepared by polymerization in the presence of a catalytic composition comprising, as a main component, a mixture of the following components (i) to (iii):

Component (i): Lanthanoid-containing compound comprising at least any one of lanthanoid elements or a reaction product obtained by a reaction of the lanthanoid-containing compound and a Lewis base Component (ii): At least one selected from the group consisting of aluminoxanes and organoaluminum compounds represented by a general formula (1): $AlR^1R^2R^3$, wherein $R^1$ and $R^2$ are the same or different and each is a hydrocarbon group having 1 to 10 carbon atoms or hydrogen atom, $R^3$ is a hydrocarbon group having 1 to 10 carbon atoms and being the same as or different from $R^1$ or $R^2$ Component (iii): Iodine-containing compound having at least one iodine atom in a molecular structure thereof.

14. The process for preparation of claim 13, wherein the condensation catalyst is a condensation catalyst comprising titanium (Ti).

15. The process for preparation of claim 13, wherein the alkoxysilane compound has at least one functional group selected from the group consisting of the following (iv) to (vii):
(iv): Epoxy group
(v): Isocyanate group
(vi): Carbonyl group
(vii): Cyano group.

16. The process for preparation of claim 13, wherein the alkoxysilane compound having at least one functional group selected from the group consisting of the following (viii) to (x) is further added in the modification step (A):
(viii): Amino group
(ix): Imino group
(x): Mercapto group.

17. The process for preparation of claim 13, wherein the condensation step (B) is performed in an aqueous solution having a pH value of from 9 to 14 and a temperature of from 85° C. to 180° C.

* * * * *